United States Patent [19]

Self et al.

[11] Patent Number: 5,634,043

[45] Date of Patent: May 27, 1997

[54] MICROPROCESSOR POINT-TO-POINT COMMUNICATION

[75] Inventors: Keith-Michael W. Self, Aloha; Craig B. Peterson; James A. Sutton, II, both of Portland; John A. Urbanski, Hillsboro; George W. Cox, Portland; Linda J. Rankin; David W. Archer, both of Beaverton; Shekhar Y. Borkar, Portland, all of Oreg.

[73] Assignee: Intel Corporation, Santa Clara, Calif.

[21] Appl. No.: 295,556

[22] Filed: Aug. 25, 1994

[51] Int. Cl.$^6$ .................. G06F 1/10; G06F 1/12
[52] U.S. Cl. .............. 395/558; 395/182.09; 395/182.1
[58] Field of Search ..................... 395/200.15, 475, 395/476, 182.09, 182.1, 558

[56] References Cited

U.S. PATENT DOCUMENTS

| | | | |
|---|---|---|---|
| 3,761,883 | 9/1973 | Alvarez et al. | 395/474 |
| 4,423,482 | 12/1983 | Hargrove et al. | 364/200 |
| 4,692,894 | 9/1987 | Bemis | 364/900 |
| 5,101,480 | 3/1992 | Shin et al. | 395/200.01 |
| 5,280,584 | 1/1994 | Caesar et al. | 395/250 |
| 5,347,559 | 9/1994 | Hawkins et al. | 377/54 |
| 5,363,484 | 11/1994 | Desnoyers et al. | 395/200.07 |
| 5,398,325 | 3/1995 | Chang et al. | 395/468 |

*Primary Examiner*—Gopal C. Ray
*Assistant Examiner*—Jigar Pancholi
*Attorney, Agent, or Firm*—Blakely, Sokoloff, Taylor & Zafman

[57] ABSTRACT

A computer system having at least a first microprocessor for processing information and a first memory coupled to the first microprocessor via a first point-to-point interface. The first point-to-point interface provides communication of signals between the first microprocessor and the first memory irrespective of the phase of the signals received by either the first microprocessor or the first memory. The first point-to-point interface includes a first point-to-point circuit in the microprocessor for receiving the signals from the first memory. The first point-to-point circuit and the microprocessor comprise a single integrated circuit in some implemented embodiments, providing ease of construction and design of systems having a variety of topologies. A second microprocessor may also be coupled to the first memory via a second point-to-point interface, the first microprocessor and the second microprocessor sharing the first memory for storage of information used by the first microprocessor and the second microprocessor. In this configuration, the first memory may include a duplicate cache store for the first microprocessor and the second microprocessor, in order to provide cache consistency for the two processors. The system may also include a first input-output device coupled via a second point-to-point interface to the first memory. A variety of topologies of processors, memories and input/output devices may be designed into "clusters" wherein each cluster communicated with one another for accesses, remote and local, for accessing input/output devices, and for maintaining cache consistency.

32 Claims, 21 Drawing Sheets

Read Access to
Local Memory

Invalidate/ Write Access to Local or Remote Memory

Read Access to
Remote Memory

MICROPROCESSOR POINT-TO-POINT COMMUNICATION

BACKGROUND OF THE INVENTION

1. Field of the Invention

The present invention relates to communication between computing resources, such as processors. More specifically, the present invention relates to a point-to-point communication scheme between computing resources which is phase tolerant.

2. Background Information

Communication between computing resources, such as processors, is an integral part of multi-processing and is often a limiting factor in performance. As more processors are applied to solving larger problems, the demand for higher bandwidth communication increases. Prior art processor communication includes the shared bus approach wherein a plurality of processors or other computing resources are coupled together via a single bus. At bus frequencies greater than 50 MHz, this well known prior art technology is limited by poor transmission characteristics and poor spatial flexibility. Difficult clock phase tuning and many signal pins for control information on the bus, as well as a bus protocol for requesting and granting access to the bus is required in a shared bus scheme. In addition, the variable distances caused by connecting large numbers of processors in a massively parallel system results in large phase differences between signals between communicating resources.

One prior attempt to solve this problem has been the use of point-to-point self-timed interfaces. Some of these interfaces operated in the interlocked mode, returning an acknowledgment for each data transfer. However, attempts to increase communication performance led to the "streaming mode" wherein data is stored on the wire up to the full capacity of the medium. In certain prior art attempts, up to four data transfers were made before acknowledgments from the receiver were required. In essence, this amounts to a locally synchronous environment. Extension of this synchronous type of scheme is difficult to implement because each pin interface has its own unique self-timing aspects. Several problems are incurred by the use of a self-timed approach from the core logic and the communication between computing resources, for example, in a massively parallel environment.

"Streaming Mode"

Self-timed designs require very careful designing at each stage in the transmission path since loss of timing margins of data over control results in errors in sampling of transmitted data, and thus the non-functionality of communication between the computing resources. Further, there is no clock to slow down to allow de-bug of such designs. Testing and verification of self-timed design is inherently difficult because vector applications are time-critical. Further, "streaming mode" self-timed circuits must limit their transmission rate to avoid overrunning the receiver in the system.

In general, distributed multi-processing applications present a large variety of problems. For example, computing resources, such as processors require fast, low latency communication whether they are for memory accesses or multi-processor message passing. Further, communications should be synchronous to avoid problems associated with asynchronous and self-timed designs. Communication should occur at the highest possible bandwidth but require as few wires for the communication as possible. Moreover, the method should be scalable to any distance between processors, and any size of circuits with the fabrication process.

Also, the communication scheme should address the spatial distribution problems for clocks and data. Since distances between processors may vary widely within a system, it is important that the solution address the phase difference between processors wherein the distances between processors in a massively parallel environment may vary significantly.

Thus, one solution to solving all these problems has been a self-timed point-to-point (PTP) communication scheme to address some of these problems. However, the problem of synchronous communication still exists. Further, phase tolerance of the communication is one other significant problem which needs to be addressed to provide a complete solution to allow for scalability, and tolerance of phase differences, and distance between computing resources in a computing system, especially a massively parallel system, in order to fully implement such a solution.

Yet another problem in which shared bus technology reaches its upper limits is where processor and bus speed exceed clock frequencies over 33 MHz. The electrical limitations of a shared bus with distributed drivers and receivers begin to have a significant effect above this operating speed. They have difficulty in dealing with the poor quality of the transmission on the transmission lines and the heavy loading due to multiple inputs and outputs.

In current technology processors wherein clock speed doubled from the 33–50 MHz range up to the 100 MHz operating speeds of today's processors, bus technology has not been able to make the transition. Therefore, buses operate typically on the order of half of the processor's operating speed along with attendant weight states so that the transmission between components on the bus does not exceed the physical operating limits of the bus. Modern processors are starting to exceed the 100 or even 200 MHz range. Thus, for microprocessor communication, it is desirable that a bus obtain higher performance than that achieved with prior art bus technology.

Prior art shared bus technology suffers from several deficiencies for the use with current state of the art microprocessors. First, treatment of the bus as a transmission line (required for higher operating frequencies) is difficult because each additional driver lowers the impedance of the wire or requires that the driver have infinite impedance when it is not in use. If a driver has infinite impedance when it is not in use, then the time it takes to match the impedance of the line is time spent driving the line with an unmatched impedance. This results in line mismatch reflections, inefficiencies, more difficult receiver design and, ultimately, a lower speed communication because the receiver must wait for the data to be valid. Parallel terminated buses also usually draw static power and suffer from many of the same shortcomings.

Also, because multiple drivers must communicate on the shared bus, the distance from bus agent A to bus agent B cannot be the same as that from bus agent A to bus agent C. This means that the time to communicate between agents on the shared bus is different, and one prior art solution is to wait until all or most of the reflections on the bus have abated. This results in lower performance.

Finally, in a shared bus topology, electrical signal integrity suffers from several problems. Bus stubs must be terminated to avoid reflections, and distance between drivers in the board make board layout different. Driver placement is critical to avoid reflection and minimize settling time. Shared bus designs are not easily scalable above 70 MHz. Thus, for modem processors design, such as microprocessors, new bus topologies are required.

SUMMARY AND OBJECTS OF THE PRESENT INVENTION

One of the objects of the present invention is to provide a communication method between computing resources which is tolerant of phase differences between inbound data and the master clock at the receiver.

Another of the objects of the present invention is to provide a communication method between computing resources which is scalable up to very large systems including many resources (e.g., processors or other resources).

Another of the objects of the present invention is to provide an apparatus for communication between computing resources which minimizes the problems associated with shared bus technology operating at large frequencies.

Another of the objects of the present invention is to provide a bus topology useful in conjunction with computing resources such as microprocessors and memory and other computing resources.

Another of the objects of the present invention is to provide a means for communicating between computing resources at high speeds which is tolerant of temperature and voltage differences between sending and receiving resource.

Another of the objects of the present invention is to provide a communication scheme between computing resources which does not require a phase-synchronous environment.

Another of the objects of the present invention is to provide a communication scheme between computing resources which does not require an extensive hand-shaking protocol between computing resources while transmitting data.

These and other objects of the present invention are provided for by a computer system having at least a first microprocessor for processing information and a first memory coupled to the first microprocessor via a first point-to-point interface. The first point-to-point interface provides communication of signals between the first microprocessor and the first memory irrespective of the phase of the signals received by either the first microprocessor or the first memory. The first point-to-point interface includes a first point-to-point circuit in the microprocessor for receiving the signals from the first memory. The first point-to-point circuit and the microprocessor comprise a single integrated circuit in some implemented embodiments, providing ease of construction and design of systems having a variety of topologies. The first point-to-point interface also includes a second point-to-point circuit coupled to the first memory for receiving the signals from the microprocessor, in order to provide full bi-directional communication capabilities.

A second microprocessor may also be coupled to the first memory via a second point-to-point interface, the first microprocessor and the second microprocessor sharing the first memory for storage of information used by the first microprocessor and the second microprocessor. In this configuration, the first memory may include a duplicate cache store for the first microprocessor and the second microprocessor, in order to provide cache consistency for the two processors. In another implementation, cache consistency may be provided by broadcasting references to other processors in the computer system. The system may also include a first input-output device coupled via a second point-to-point interface to the first memory.

The first microprocessor, the first memory and the second microprocessor may be known as a first cluster, the first cluster coupled to a second cluster via a third point-to-point interface, wherein the third point-to-point interface is for routing signals to the second cluster. In this manner, the computer system may have a plurality of clusters, wherein each's memory is treated as a part of a global address space in the computer system accessible by any of the clusters. In this instance, a router is provided in each cluster for determining whether an access is in a range in the global address space assigned to the memory for the cluster. An access circuit will be provided for accessing the memory operative upon the determination that the first access is in the range for the cluster. A transmission circuit may also be provided for broadcasting the access to another cluster via the third point-to-point interface for remote accesses, and updating of remote duplicate cache stores.

The third point-to-point interface may be a pair of unidirectional point-to-point communication lines, a third point-to-point circuit in the first router coupled to a first of the unidirectional communication lines for receiving signals from the second cluster, and a fourth point-to-point interface in the second router coupled to a second of the unidirectional communication lines for receiving signals from the first cluster.

Other objects, features and advantages of the present invention will be apparent from viewing the figures and the description which follows below.

BRIEF DESCRIPTION OF THE DRAWINGS

The present invention is illustrated by way of example and not limitation in the figures of the accompanying in which like references indicate like elements and in which.

DETAILED DESCRIPTION

Figure 1A:
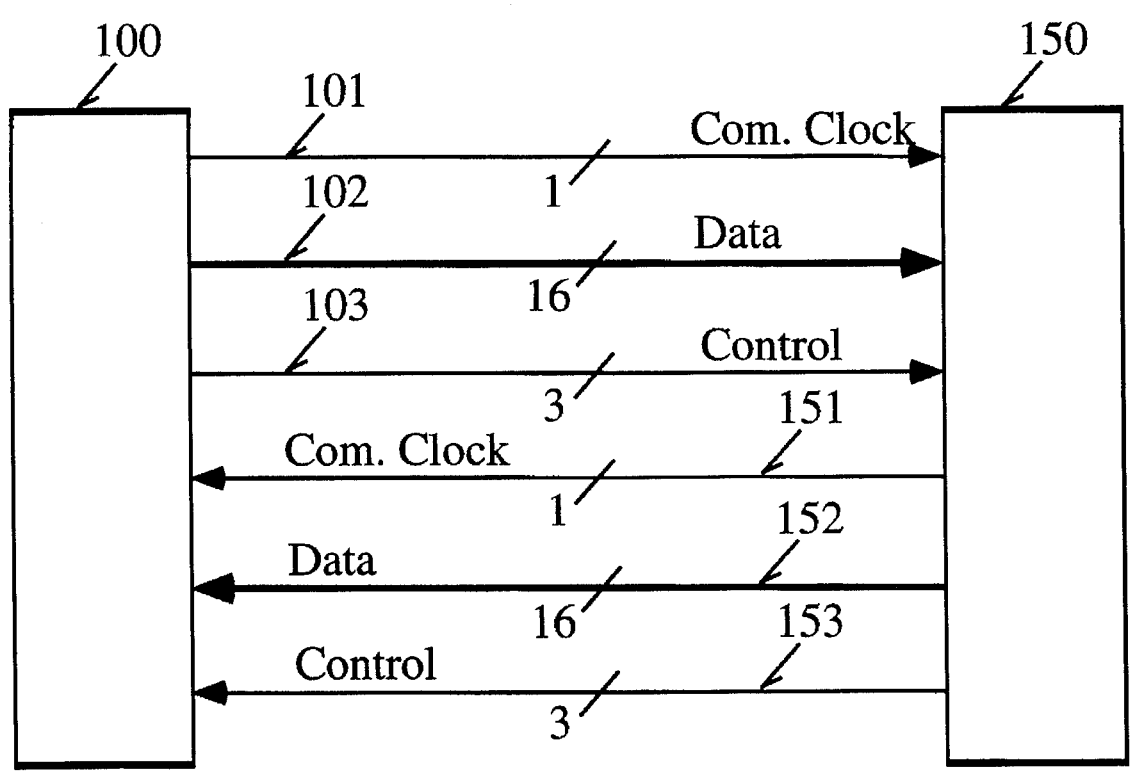
FIG. 1a illustrates a point-to-point communication scheme between two computing resources.

The present invention relates to communication between computing resources. This application relates to a technology for point-to-point communication among computing resources, whether those computing resources are processors in a multi-processing design, memories, input/output devices or general purpose ports. For the remainder of this application, for the purposes of discussion, very specific circuits, structures, signals and method steps will be described, for the sake of completeness, however, they are to be in no way viewed as limiting the present invention. Other equivalent circuits may be used, as can be appreciated by one skilled in the art, without departing from the overall spirit and scope of the present invention. Thus, the apparatus and method described here is for illustrative purposes only, and do not limit the present invention.

Implemented embodiments of the present invention utilize a uni-directional communication channel, wherein a single computing resource acts as a transmitter and a single computing resource acts as a receiver. This is illustrated with reference to the block diagram of FIG. 1a. For example, a first computing resource 100 has transmission capability to send to a second computing resource 150 signals and/or messages via the uni-directional communication lines 101–103. The lines include a high speed communication clock line 101 which is driven at a frequency of approximately 100 MHz (or higher), 16 bits of data carried on lines 102, and 3 bits, in this embodiment of the present invention, carded on signal lines 103 for control. For communication from computing resource 150 to computing resource 100, a second set of signal lines 151–153 may be provided for full bi-directional communication. As discussed above, 100 or 150 in most embodiments of the present invention are processors and associated circuitry, however, they may be any computing resource depending upon the application, such as an input output device (I/O), external port, a router or other resource used in a computer system. Note that the distance between the two computing resources 100 and 150 may be arbitrary, as the described technology discussed in the remainder of this application is tolerant of very long distances between computing resources. For example, in a massively parallel computing environment, in a circumstance where all nodes comprise separate computing resources, communication with one another may be provided, and distances may vary greatly between individual nodes according to their physical placement. Therefore, one feature of implemented embodiments of the present invention is that signaling between computing resources be phase-tolerant. That is, because of unknown variances in distances between the transmitter and receiver, the phase at the receiver is unknown. The particular circuitry for providing this capability will be discussed below. In addition, even though uni-directional signal lines are illustrated in FIG. 1a, for maximum flexibility, such uni-directional data signal lines come in pairs in some embodiments of the present invention for full bi-directional communication in order to provide flow control, and other communication capabilities which may be required in certain implementations.

Figure 1B:
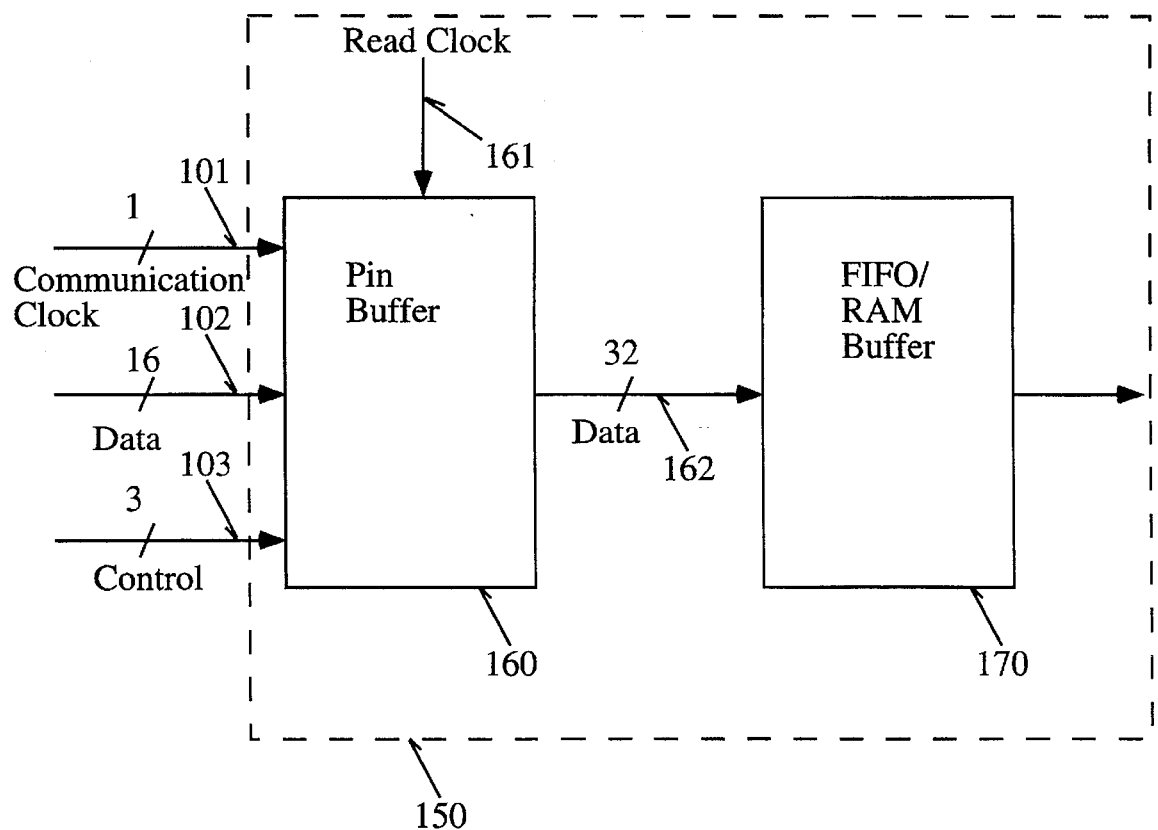
FIG. 1b illustrates a block diagram of a pin buffer receiver and FIFO/RAM buffer in a receiver using embodiments of the present invention.

FIG. 1b illustrates a detail of circuitry contained within a receiver such as 150 of FIG. 1a, including pin buffer 160 and a FIFO or RAM core buffer 170. As data is received over lines 102, as conditioned by communication clock line 101 and under control of control lines 103, the pin buffer receivers 160 ensure that data is sampled after the appropriate set-up and hold times for reading by the receiver. The details of the pin buffer 160 in the receiver will be discussed in more detail below. Because the distance between transmitters and receivers in a system using this communication scheme may vary, receiver 150 also includes a FIFO or RAM core buffer 170 which contains sufficient storage for storing the maximum number of messages which can be transmitted on the longest data path between any transmitter and receiver in the system. Thus, flow control signals issued over control lines such as 153 of FIG. 1a, may be used to prevent FIFO or buffer overrun. Pin buffers 160 ensure that the data is sampled at the appropriate time intervals, and FIFO/Buffer 170 ensures that sufficient capacity is present to store all messages which may be present on the data line between the transmitter and receiver.

Note that the pin buffers 160 are conditioned by an internal read clock within the receiver over signal line 161, wherein the read clock operates at the same frequency as the communication clock carded on line 102 as transmitted by the receiver. However, the phase relationship between the read clock and the communication clock received from the transmitter is unknown. The difference in phase is compensated for by pin buffers 160 as will be discussed in more detail below. Note also that data lines 162 between the pin buffer receivers 160 and the FIFO/RAM buffer 170 within the receiver comprises 32-bits of information because data is sampled both on rising and falling edges of the communication clock. Thus, two communication clocks are used for obtaining 32-bits of data although this is merely one implementation of this scheme. Other designs may be used, using different data path widths of all of lines 101–103. The details of the pin buffers will now be discussed.

Figure 2:
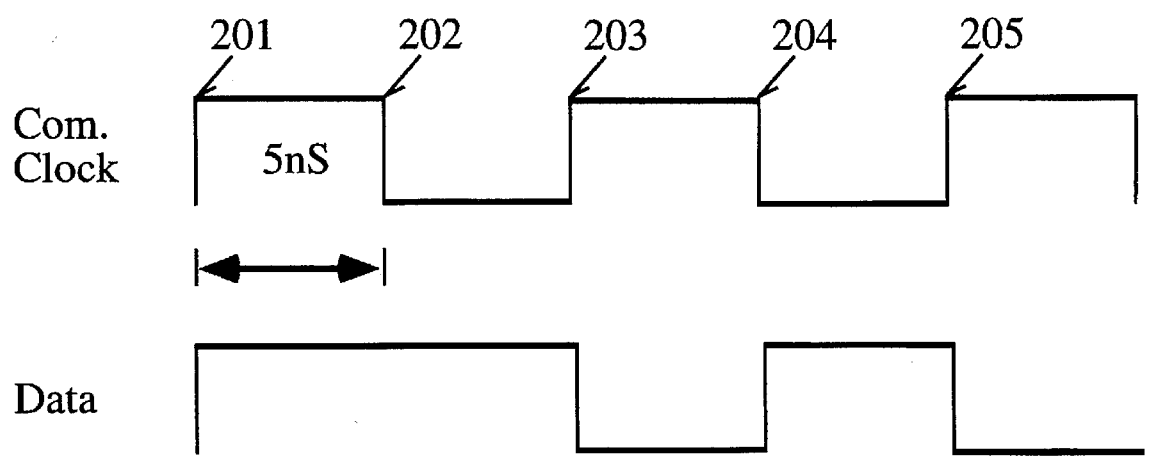
FIG. 2 illustrates the relationship between a communication clock and data which is driven between two computing resources in implemented embodiments of the present invention.

Implemented embodiments of the present invention use a high speed communication clock that toggles at the maximum data rate capable of being transmitted on the medium, and the clock has the same phase as the data and control signals transmitted from the transmitter. The clock signal is used by the receiver to sample the incoming data because data is driven in phase with the clock. However, as opposed to certain prior art schemes, instead of the data being sampled on rising edges only such as 201, 203 and 205 illustrated in FIG. 2, in implemented embodiments of the present invention, data is sampled at both rising and falling edges of the clock, for example, 201–205. Data therefore changes every 5 nanoseconds providing an overall operating frequency of 200 MHz, or two times the frequency of the communication clock.

Figure 3:
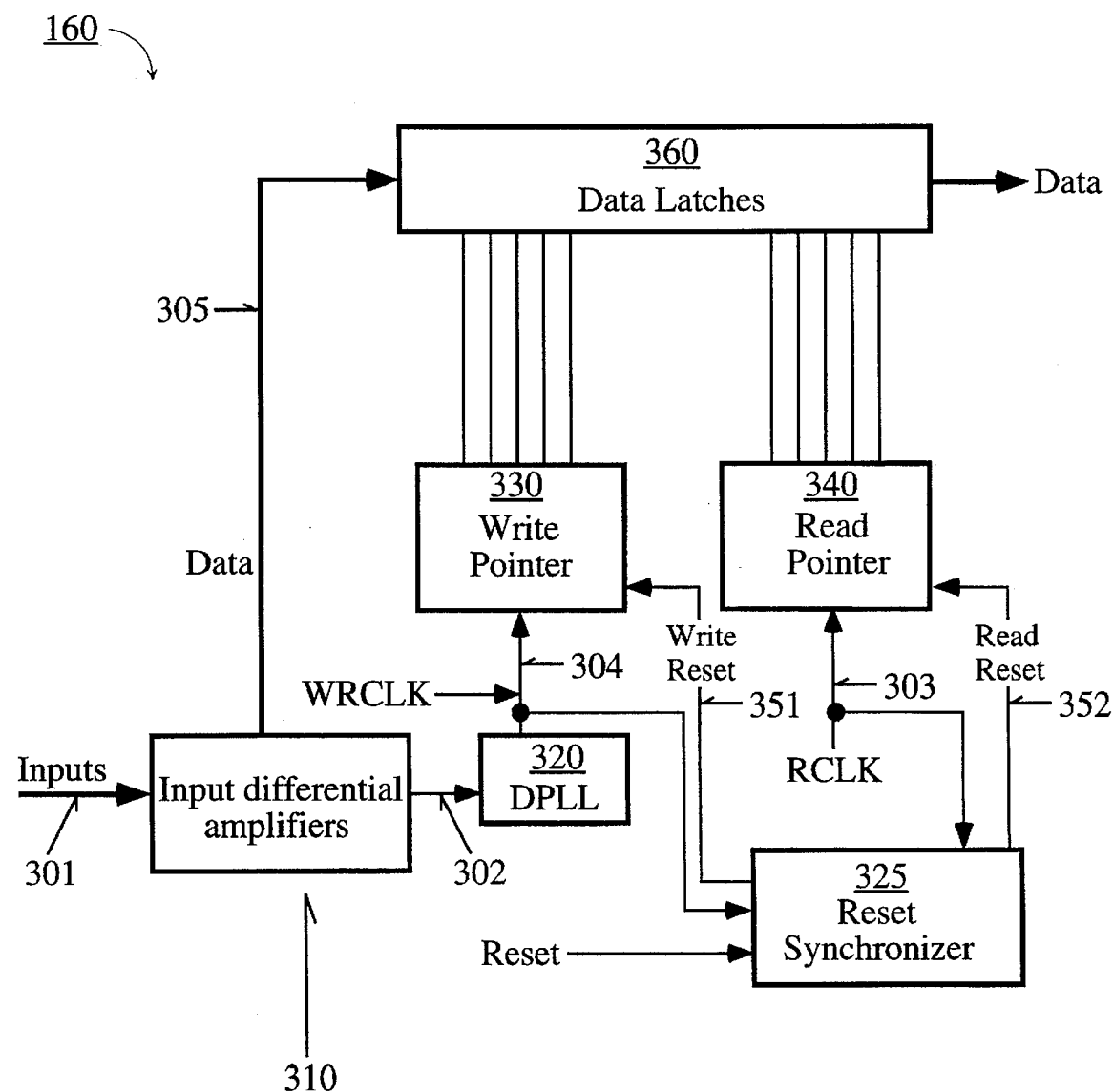
FIG. 3 illustrates a detail of receiving circuitry contained within a computing resource or processor which is used in implemented embodiments of the present invention.

FIG. 3 illustrates a block diagram of the circuitry 160 contained within a receiver (e.g., 150 of FIGS. 1a and 1b)

for receiving signals from a transmitter (e.g., 100 of FIG. 1a). The receiver may be present on unidirectional lines of a multi-channel router, or coupled to pins on a processor, such as a microprocessor. The receiver 160 accepts via input lines 301 (e.g., lines 101, 102 and 103) control, clocking and data. These are input to a series of differential amps 310 to increase the quality of the signals. The processed communication clock signal from line 101 is then passed to a digital delay lock loop circuit 320 via line 302 for determination of the phase of the incoming clock signal. Then the data lines (e.g., 102 in FIG. 1a) received via inputs 301 are passed to data latches 360 for sampling at the appropriate intervals. Data latches 360, in implemented embodiments of the present invention, may comprise flip-flops for queuing up incoming data from the transmitter. Data latches 360 are controlled by write pointer 330 for receiving data. Data is read out via read pointers 340. The pointers 330 and 340, and thus, the latches 360 are controlled, in turn, by a reset synchronizer 325. Read pointer 340 is under control of the core clock of the receiving computing resource, and the write pointer 330 is under control of the communication clock received from the transmitter (e.g., 101 of FIG. 1a). This signal, however, is conditioned by the digital delay lock loop circuit 320. The write pointer 330 and the read pointer 340 for accessing latches 360 are based on the same frequency clock, however, they are out of phase. An appropriate time delay between the read and write pointers ensures that the dam input on lines 301 is sampled after an appropriate set up interval to allow the data to become stable. The details of this circuit will be discussed in more detail below.

The data transfer protocol between transmitter and receiver continuously sends either valid data or a null data pattern, as indicated by certain bits in the control lines (e.g., 103 of FIG. 1a). The null data pattern is used for initialization of the DDLL during reset. After reset of the receiver circuitry, the pointers are correctly spaced so that write overrun, or read underflow in the latches 360 does not occur. This is under control of a reset synchronizer circuit 325 which controls the write pointer 330 and the read pointer 340. The synchronizer circuit 325 monitors the pointers to detect and correct any overlap.

Figure 4:
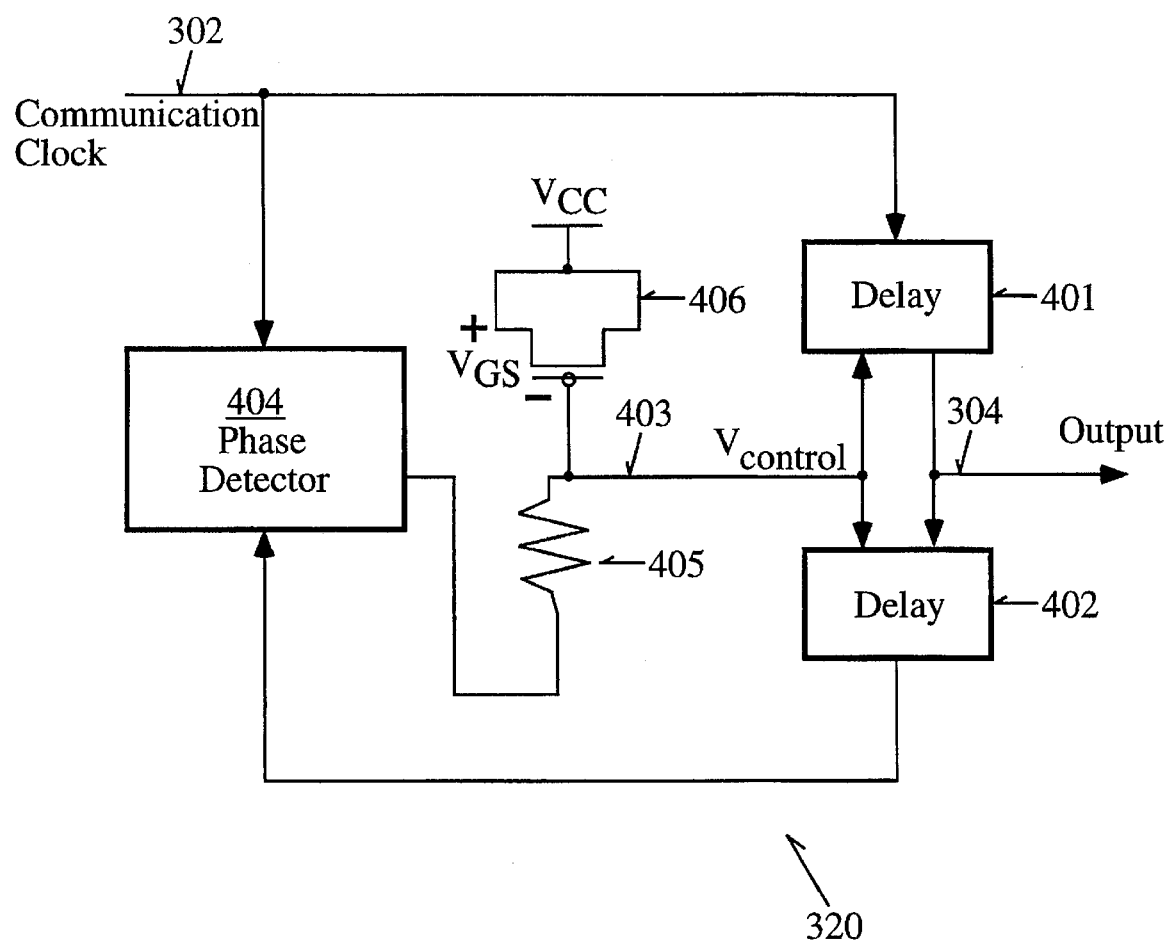
FIG. 4 illustrates a detail of a digital delay lock loop circuit, DDLL.

A more detailed view of the digital delay lock loop circuit 320 from FIG. 3 is shown in FIG. 4. The digital phase lock loop circuit 320 provides the correct set up and hold time for the data by positioning the clock edge (as illustrated by 201 and 202 of FIG. 2) midway in the data cell. After reset, the delay elements 401 and 402 have the minimum delay. The delay element control voltage over line 403 to the delay elements 401 and 402 step slowly until the delay through the two delay blocks matches one-half the period of the actual communication clock received over 302. This thus puts the mid-point tap or output of the delay element 304 at the midpoint of valid data on the communication clock. Since the data latches are edge triggered and the delay path through the latches has been matched by the clock path, the sampling occurs at mid-point of the dam valid time. The delay is variable according to the $V_{control}$ voltage on line 403 to delays 401 and 402. The phase detector 404 can determine the appropriate phase of the incoming transmission signal clock and therefore adjust the delays accordingly.

The delays make the DDLL circuit 320 tolerant over a large range of temperature, voltage and process. The circuit is remarkably $V_{cc}$ insensitive over the range of 3–3.6 volts in implemented embodiments giving a variation in delay of only one percent. The added capacitance counteract the increased drain to source current (IDS) of the delay chain inverters. The IDS increases because the $V_{cc}$ of the inverter increased thereby increasing $V_{gs}$.

Figure 5:
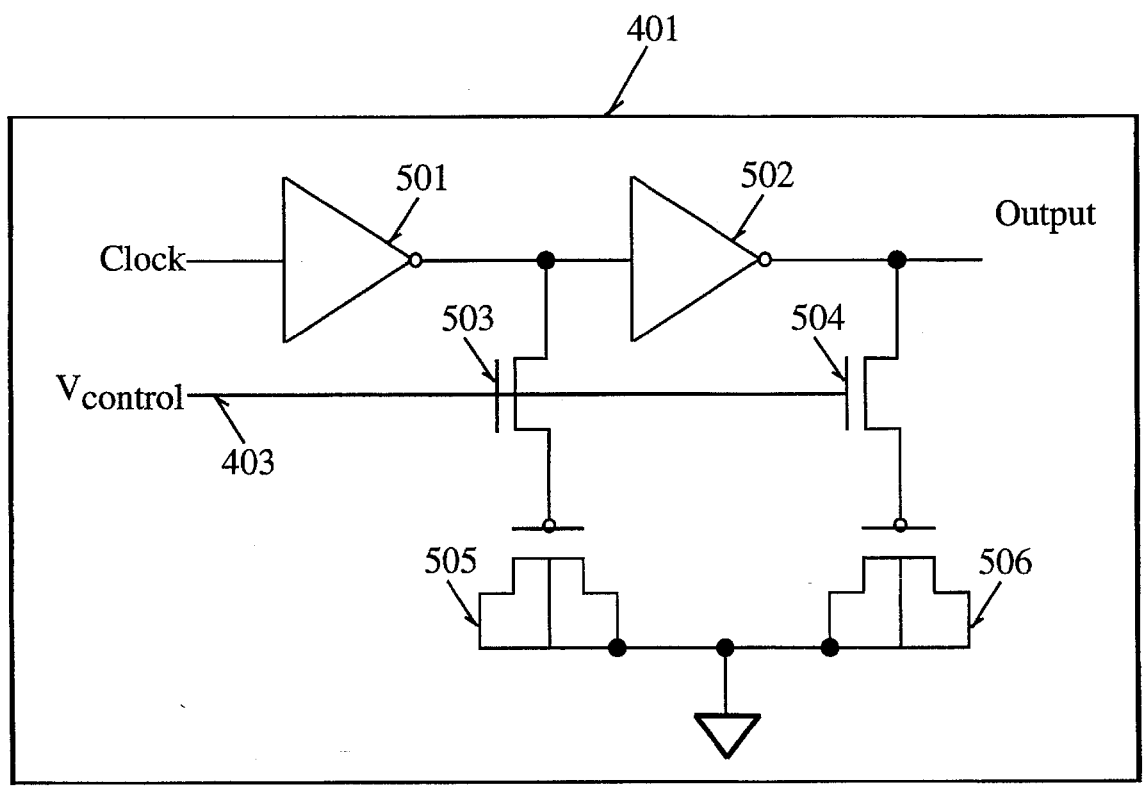
FIG. 5 illustrates a detail of a delay element used in the digital delay lock loop circuit.

FIG. 5 illustrates a more derailed view of one of the delay elements 401 or 402 shown in FIG. 5. Each delay element has a total of eight inverters, however only a pair of inverters 501 and 502 is shown coupled in series in Figures with taps going to resistive elements 503 and 504. As $V_{cc}$ increases, $V_{control}$ increases input over line 503, and the resistance generated by devices 503 and 504 decreases. Thus, the load of each inverter 501 and 502 increases by the capacitance of its respective capacitor 505 and 506. The propagation time increases at a rate to compensate for the increased current to drain of the P type transistors in the inverters. Because the capacitor 406 is so large, changes in $V_{cc}$ are reflected on node 403. In this way, when $V_{cc}$ rises instantaneously, so does the $V_{control}$ voltage. As $V_{control}$ rises, it couples more capacitance from the delay element capacitors 505 and 506 to the nodes (outputs of 501 and 502). It does this by turning on the N type transistors 503 and 504.

Figure 6:
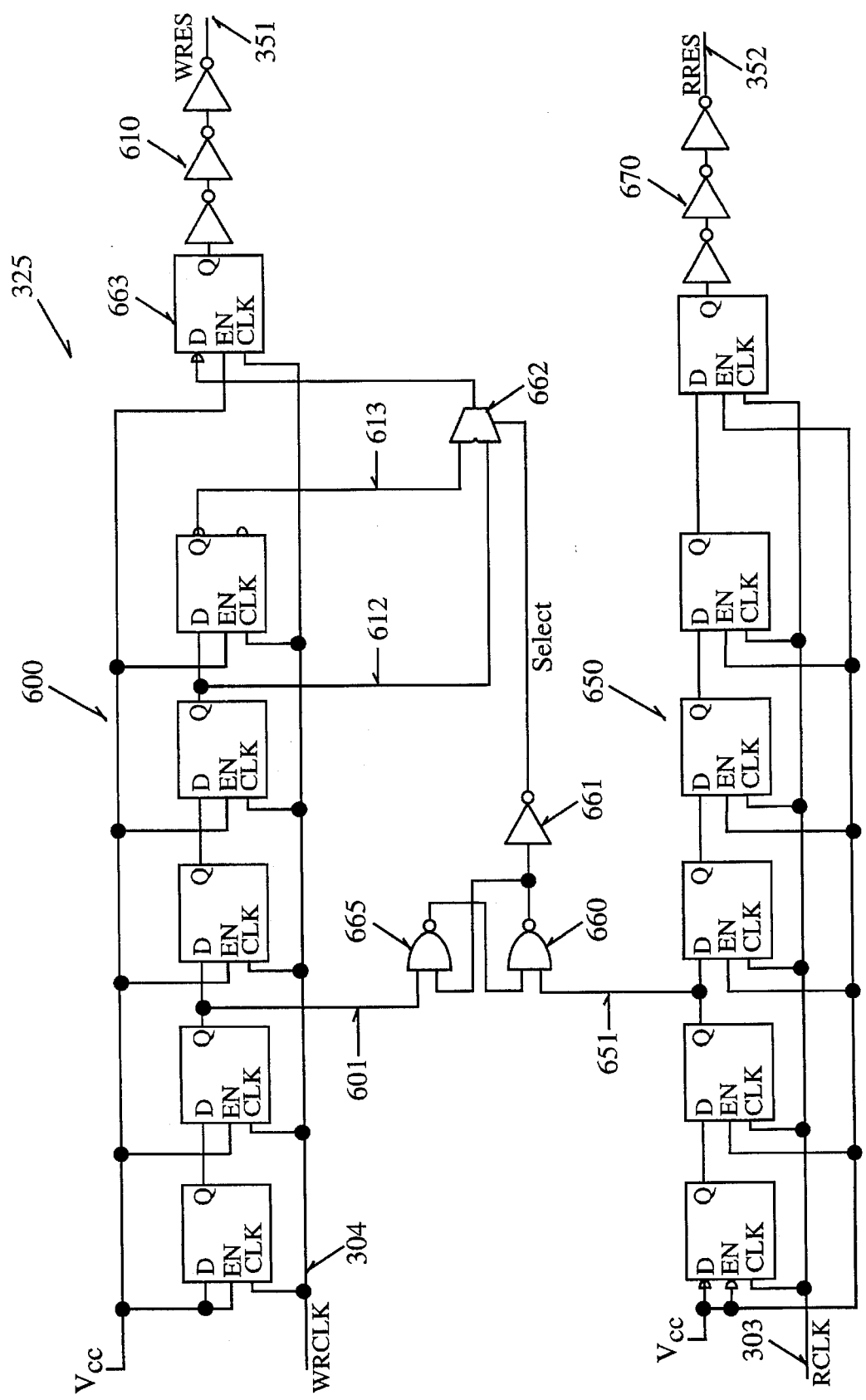
FIG. 6 illustrates a detail of circuitry used for an reset synchronizer in one embodiment of the present invention.

After component reset, when the receiver's latches 360 are started, the read and write pointers 330 and 340 are synchronized with a difference of at most one clock cycle between them. If, after reset, the read pointer clock rising edge is ahead of the write pointer clock rising edge, reset synchronizer 325 selects an earlier write clock from a clocked delay chain. Reset synchronizer 325 is illustrated in more detail in FIG. 6. With a communication clock frequency of 100 mHz, the difference in read and write pointer clocks is between 400 picoseconds and 10 nanoseconds in implemented embodiments (or approximately a clock period between a rising and a rising or a falling and a falling edge).

The write clock output carded on signal line 304 from digital delay lock loop circuit 320 is input to a series of flip-flops 600 which all have their data and enable pins tied to $V_{cc}$. A tap 601 is present at a second flip-flop which is input to a circuit for selecting the appropriate write clocks to output on write reset line 351. Also, the read clock output is received from the core over line 303 which drives the read flip-flops 650. It also has a tap 651 which is driven by the second flip-flop in the selection circuit. The two taps 601 and 651 are input to a flip-flop composed of a pair of NAND gates 665 and 660 which each accept as the other input the output from the other NAND gate. The output from NAND gate 660 is input to an inverter 661 which is then used as the selection by multiplexor 662. Multiplexor 662 then, depending on the signal output from inverter 661 selects either of the outputs from the next to the last flip-flop over line 612, or the last flip-flop output 613. Then, the appropriate signal from the appropriately timed write clock is output to a final flip-flop 663, which then drives three inverters 610 and the appropriate write reset signal over line 351. The read request line output over line 352 is driven through inverters 670. The reset synchronizer, ensures that the write pointer is ahead of the read pointer clock by at least a single clock of WRCLK.

Figure 7:
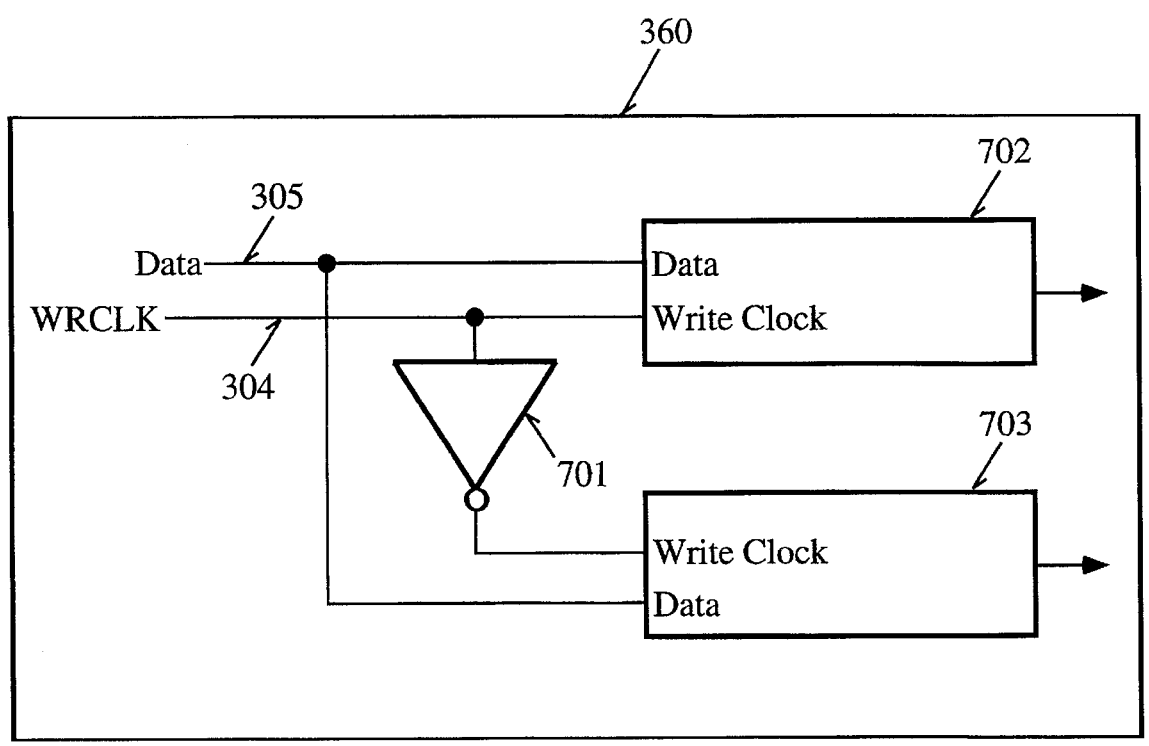
FIG. 7 illustrates a detail of dual FIFO latches used in implemented embodiments of the present invention.

FIG. 7 illustrates a more detailed view of a portion of the data latches 360 which are shown as a pair of FIFO circuits 702 and 703 for better reliability. Because data arrives at the pin buffers every 5 nanoseconds, the writes alternate between the two FIFO's 702 and 703 so that each FIFO can work at half the maximum speed of the circuit. One of the FIFO's 702 is clocked on the rising edge of the clock, and the second FIFO 703 is clocked on the falling edge of the clock. The falling edge clocking of FIFO 703 is provided by the inverter 701 coupled to the write clock signal line 351. 702 and 703 are comprised simply of latches which allow all of the memory to be edge triggered. Since both edges of the communication clock are used to load data, edge triggering eliminates generation of load pulses on the signal lines.

Figure 8:
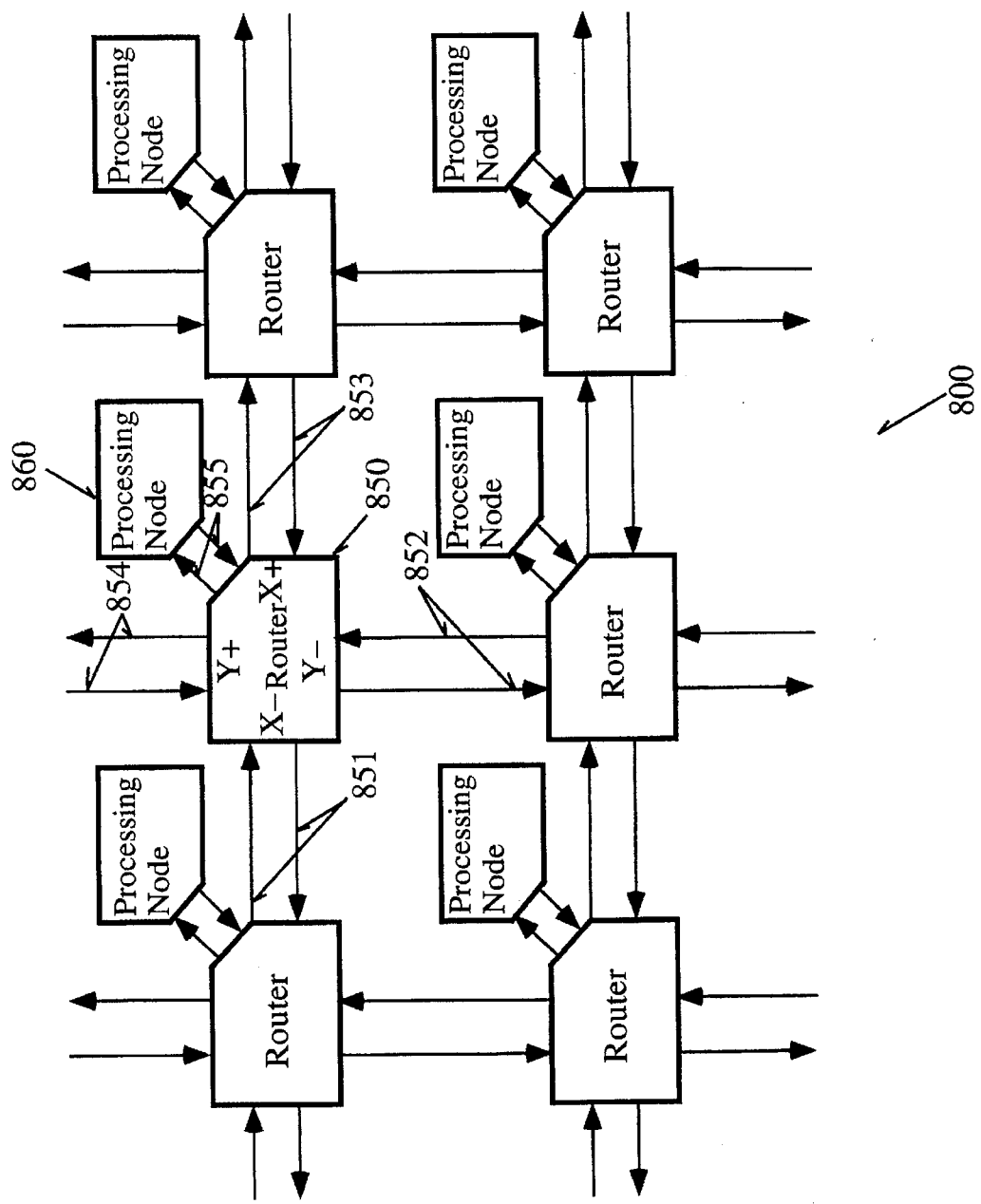
FIG. 8 shows an example topology used in a supercomputing mesh in implemented embodiments of the present invention.

FIG. 8 shows an example topology used in one embodiment of the present invention for coupling a number of processors in a mesh configuration using embodiments of the present invention. For example, 800 illustrates a mesh configuration utilizing routers in a backplane of a supercomputer system employing the point-to-point interconnect technology described above. Each router such as 850 shown in FIG. 8 may comprise pairs of uni-directional point-to-point communication interfaces such as 851–854 for coupling to other routers in both the X+ and X– and Y+ and Y– directions as illustrated for different communication channels. Thus, communication is provided between each of the routers in the mesh. Each router in the mesh backplane is also coupled via a pair of uni-directional point-to-point interconnects 855 to a processing node 860. To send a message from one processing node to another, the source processor creates a message which includes a routing header (in X and Y displacement) in two 16-bit words preceding the message. The routing header specifies the path through the backplane in the final destination. The message is passed to a router which is part of the active backplane. Routers pass the message to their nearest neighbors first along the X direction decrementing the displacement value (until the X displacement has reached zero), and then along the Y direction decrementing the Y displacement value (until the Y displacement has reached zero) similar to other 2-D deterministic routers. The final router passes the message, except for the routing header, to the destination processing node (e.g., 860).

Figure 9:
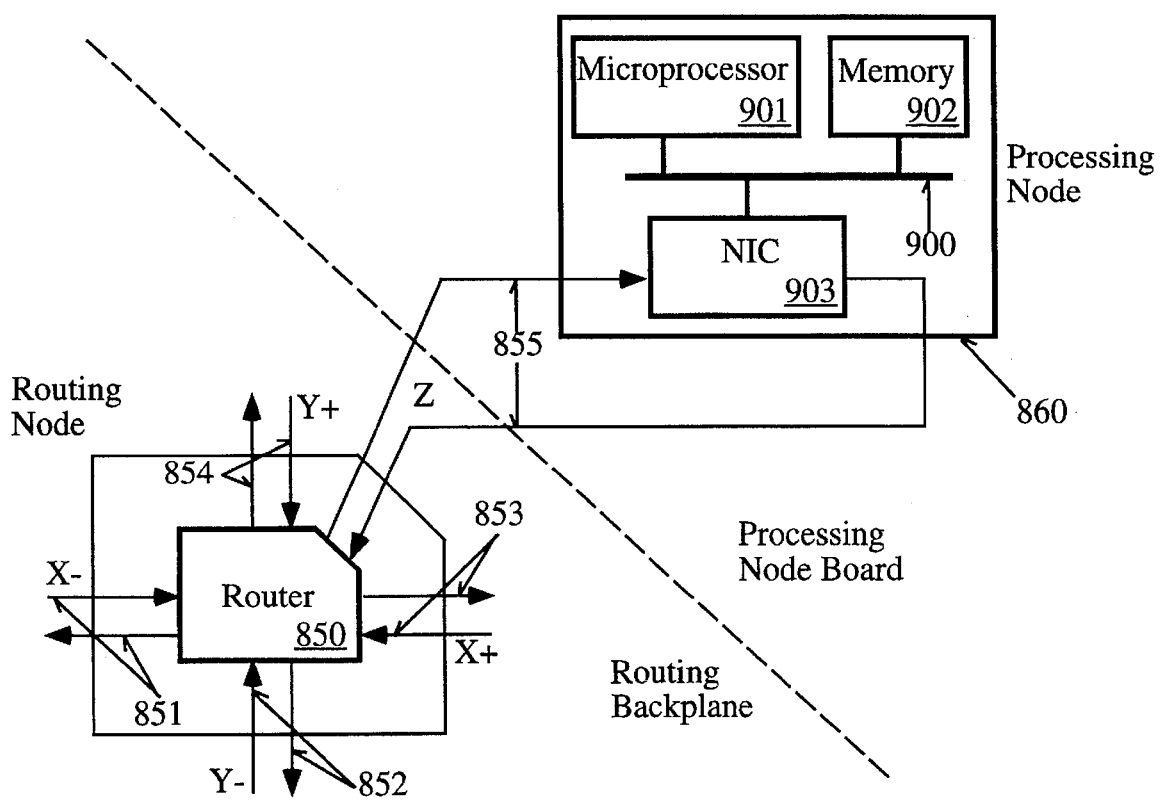
FIG. 9 shows a detail of a router and a single processing node used in the topology illustrated in FIG. 8.

A more detailed view of the single router 850, and the processing node 860 is shown in FIG. 9. For example, using this configuration, the processing node will be coupled via a pair of signal lines 855 in the Z direction for both transmission to and from the processing node 860 and the router 850. The processing node 860 may be a typical prior art processing node, comprising a processor 901 (e.g, the i860 microprocessor available from Intel Corporation of Santa Clara, Calif.), a memory 902 and a network interface component (NIC) 903 which is coupled to the pair of uni-directional communication links 855. NIC involves point-to-point communication circuitry as well as buffers and other requisite circuitry for coupling to shared bus 900. All of the components of the processing node are coupled through shared bus 900 as is common in certain prior art computer system buses. In this type of configuration, 903 may merely comprise a circuit such as that shown as 300 in FIG. 3, along with the requisite circuitry for preparing message headers to send to router 850 for transmission in the mesh. The self-timed interface between the processing node 860 and the router 850 may operate at any frequency which is less than or equal to the 200 MHz router backplane frequency used by the router 850 and other routers in the mesh 800.

Figure 10:
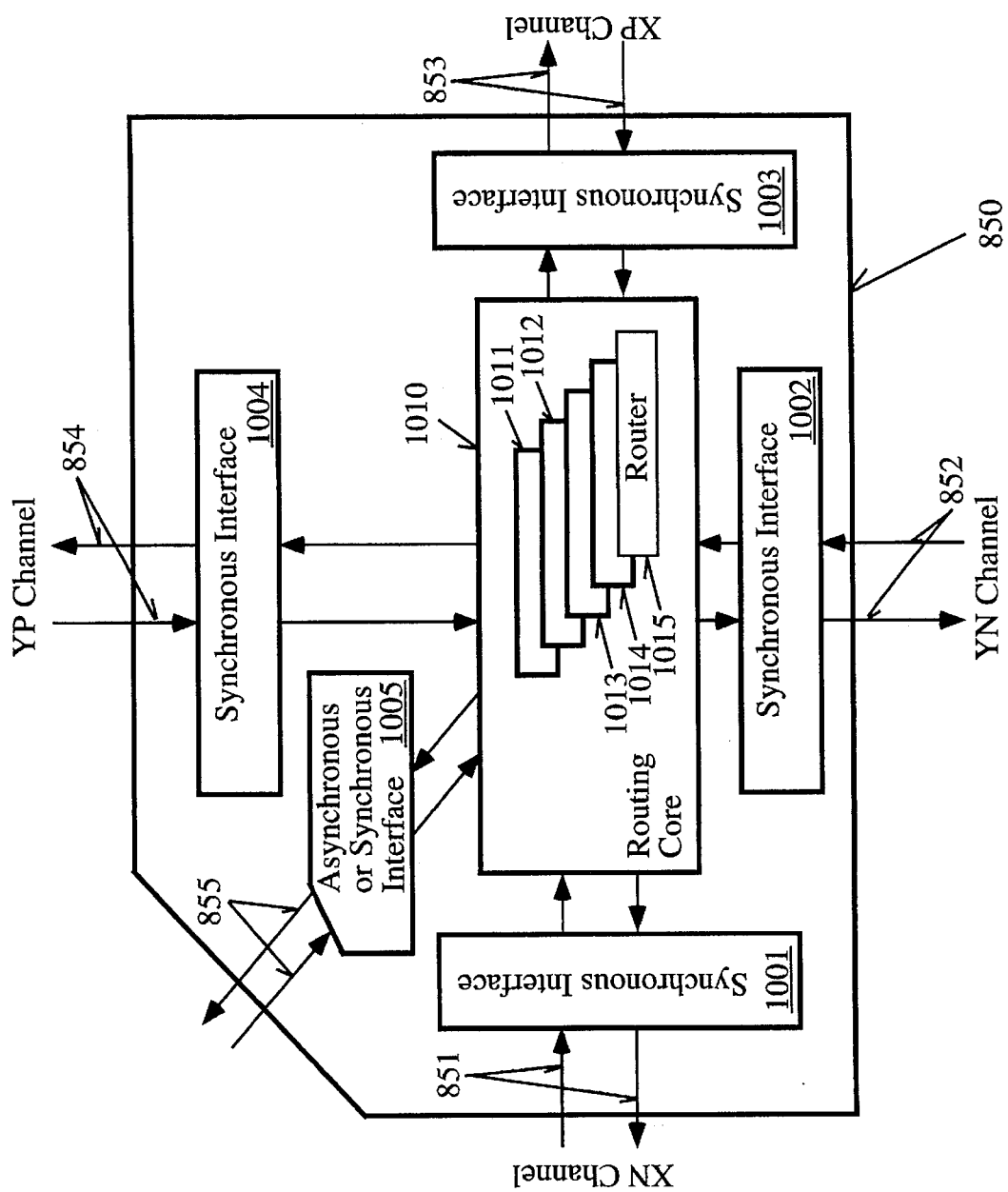
FIG. 10 illustrates a detail of the router used in the system illustrated in FIG. 8.

A more detailed view of the router is shown in FIG. 10. For example, each router such as 850 in the mesh comprises four pairs of point-to-point synchronous interfaces 1001–1004 (such as 300 shown in FIG. 3) which are each coupled to the pairs of uni-directional channels 851–854 coupling each of the channels to each of the other routers in the mesh. These are synchronous point-to-point interfaces operating at the full 200 MHz transmission rate provided by the point-to-point interconnection scheme described above. Further, the router comprises an asynchronous or synchronous interface 1005 for coupling to the computing node 860 via signal lines 855. The routing core 1010 comprises five identical routing blocks 1011–1015 for buffering data between each of the interface channels, determining a message's output direction, and arbitrating between conflicting routes from messages received. Again, circuitry is essentially duplicated in each of the routing blocks except for the preparation of message headers, and the reception and forwarding of the messages according to their headers or channels which may be indicated by control information (carded on control lines). Routing may be done in a number of ways, however, in implemented embodiments of the present invention, routing is performed via software message passing using two 16-bit words preceding the message. In another embodiment, the control lines may be used for routing information, wherein the number of control lines is sufficient to specify the destination channel.

Figure 11:
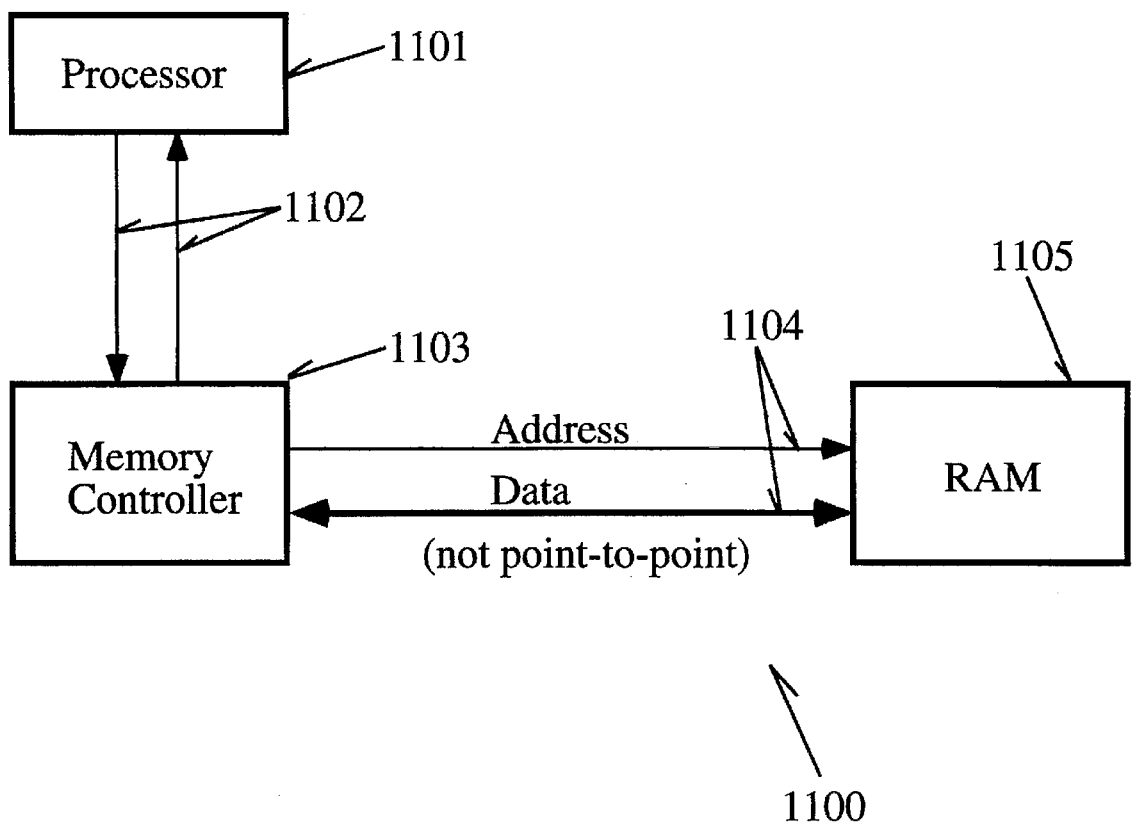
FIG. 11 shows an example topology used in a microprocessor-based computer system.

In another embodiment of the present invention, the point-to-point communication scheme described above may be utilized in a uni-processor computer system environment utilizing a single processor (e.g., a microprocessor) and a plurality of computing resources, such as memory elements, input/output devices, etc. One such alternative embodiment is illustrated in FIG. 11. For example, in this alternative configuration, a processor 1101 may be coupled to a memory controller 1103 via a pair of uni-directional point-to-point communication links 1102. In this instance, both the processor circuitry 1101 and the memory controller 1103 will contain the necessary attendant circuitry for implementing the point-to-point communication scheme described above. Note that in this configuration, memory controller 1103 may be coupled to a Random Access Memory (RAM) 1105 using a prior art bus 1104, which is not point-to-point, for communication with the memory controller. Because accessing of RAM tends to be slower than most processors' speed and the speed of point-to-point communication bus 1102, any performance penalty will not be incurred due to latencies in accessing the bus, but rather, from the access time of memory 1105. Of course, this is only one example configuration, and other uni-processor configurations are contemplated within the spirit and scope of the present invention.

Figure 12A:
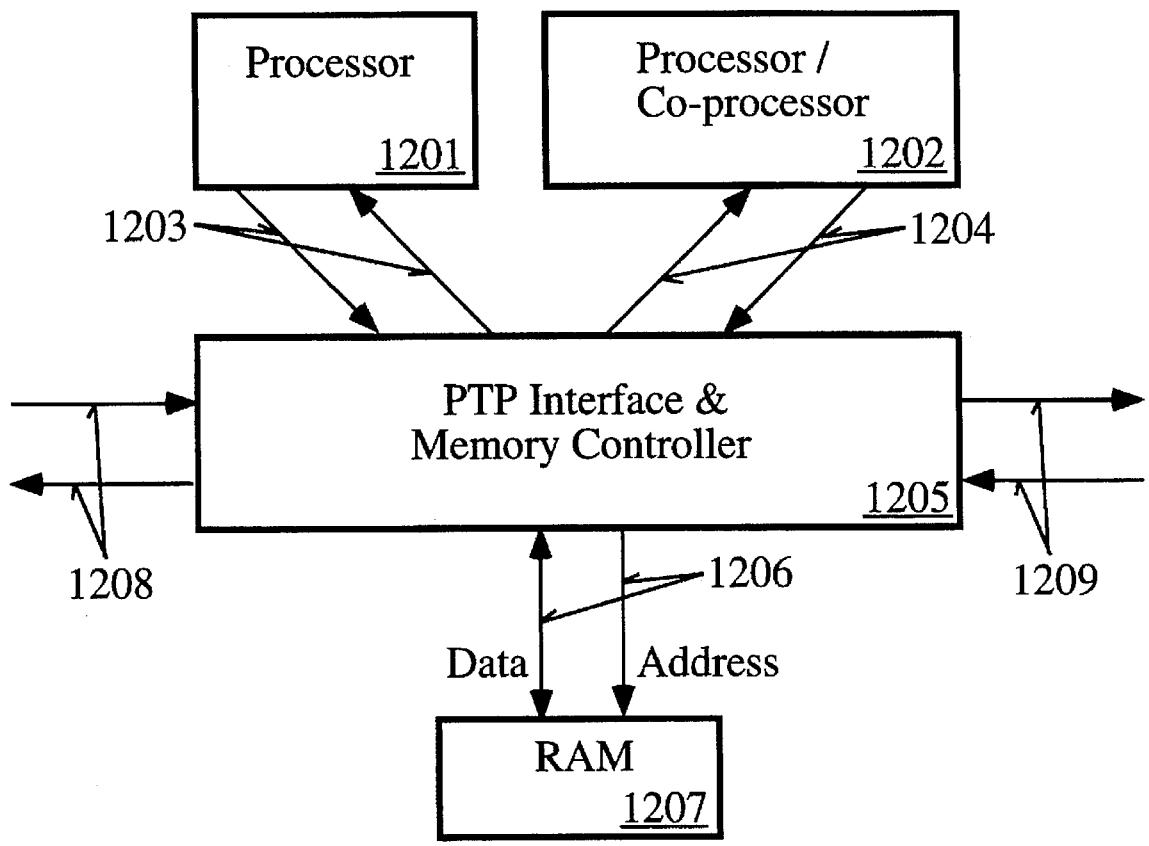
FIGS. 12a and 12b illustrate a multi-processor topology which may be used in a computer system.

Another alternative configuration for a computer system, such as that having a plurality of microprocessors (e.g., 1201 and 1202) is shown in FIG. 12a. In this example, both processor 1201 and processor 1202 (which also may be a co-processor such as a math co-processor or digital signal processor) are coupled to a point-to-point communication interface and memory controller 1205 via pairs of unidirectional point-to-point communication links 1203 and 1204. Point-to-point interface 1205 is further coupled to a RAM 1207 via a standard prior an non-point-to-point bus 1206, since high performance communication between the memory and the memory controller would not result in any increase in performance. Note further that the PTP Interface/memory controller 1205 may also be coupled to other computing resources such as input/output control circuitry, peripheral devices or other devices in a microcomputer system via pairs of communication links 1208 and 1209, implementing point-to-point communication schemes. PTP Interface/memory controller 1205 may be a suitable programmed microcontroller which has a pre-assigned channel and/or address space for the local memory, or it may be a hardware state machine with channel/routing assignment performed at system start-up, along with an associated local memory range. Other implementations may serve similar functions.

Figure 12B:
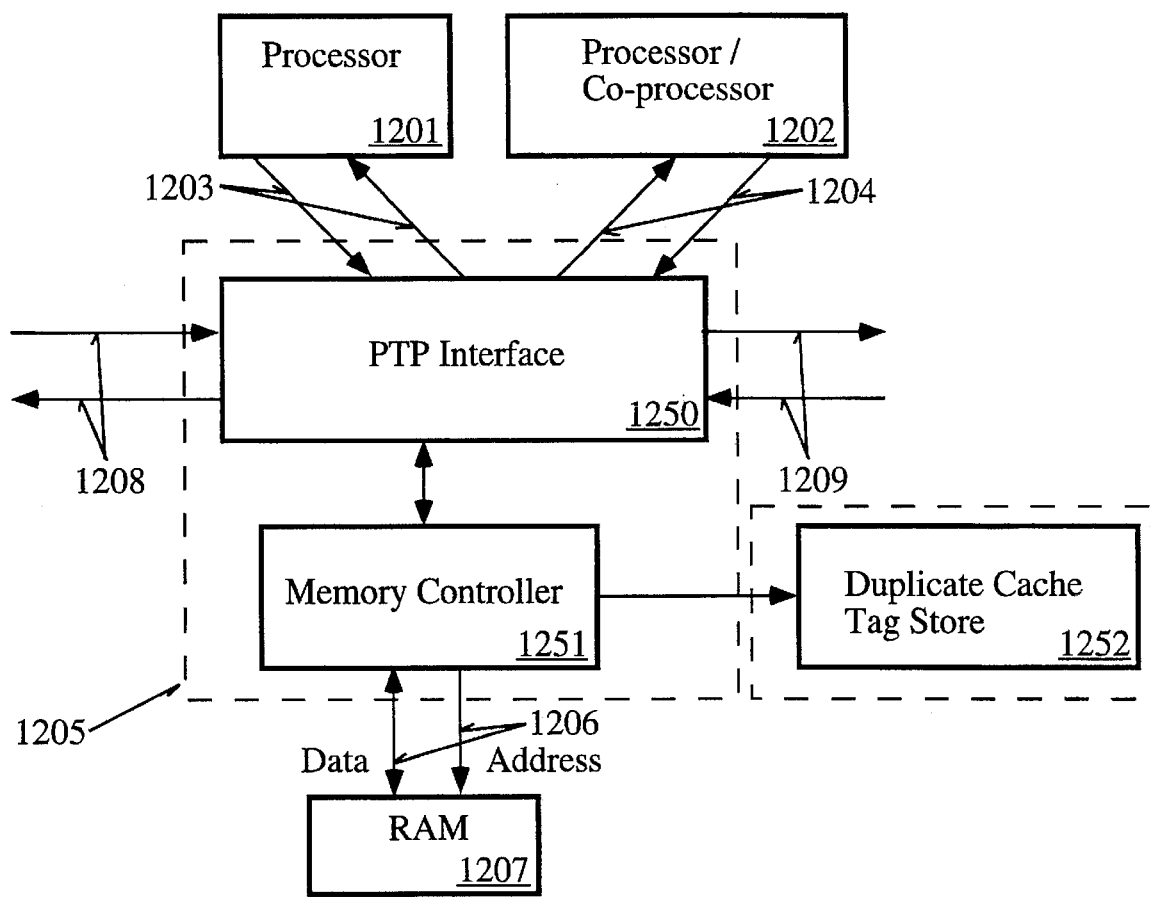

The components discussed with reference to FIG. 12a above can be generally referred to as a "micro-cluster." In implemented embodiments of the present invention, a "micro-cluster" consists of n processors (wherein n is frequently 2), a memory controller (e.g., 1251 of FIG. 12b) and a memory (e.g. 1207). The processors are connected to the memory controller/router 1205 by point-to-point links. These include communication lines 1203 and 1204. There are, further, other communication lines such as 1208 and 1209 which may be used for communication with other micro-clusters in a large topology within a computer system. The sum total of all the memory modules within the system and associated control circuitry is known as a "memory network." Memory controllers have ports into the memory network, and if a specific memory controller receives a request from a processor that is in a pre-assigned memory range that it is responsible for, it will service the request and return an appropriate response. Each memory controller in implemented embodiments of the present invention may maintain copies of the tag stores of the processors in the micro-cluster. There is also an entry for each cache line on the processors in each duplicate cache tag store. This tag store (e.g., 1252 of FIG. 12b) allows the memory controller to filter cache consistency information that is received from the memory network. The processors can use a snoop cache consistency model, as in the prior art, to ensure the validity of their cache. The processors will broadcast any change in state of a cache line and will snoop the input stream for changes that would effect the information that is contained within its cache by examining the memory address of the accesses. The consistency of caches between micro-clusters is maintained by broadcasting all read and invalidate requests into the memory network to be routed to other micro-clusters in the system. If neither processor in the micro-cluster has a copy of the cache line, then the information is discarded. Otherwise, the cache consistency information is presented to the processors in the micro-cluster as in the same way in which it would present the information if received from the other processor within the micro-cluster. Examples of other configurations of micro-clusters and topologies of systems will be described below. Also, the specific mechanics of performing local and remote read and invalidate/write accesses to caches contained within the micro-clusters are also described with reference to the flowcharts shown in FIGS. 14–16.

A second mechanism which may be used to communicate between clusters is "message passing" in which a message is constructed and passed through the network to another processor. These messages may or may not be memory references. Often, they are data or process control information used to synchronize processes across the network. This may have certain features and/or advantages over the global memory paradigm described here.

Figure 13:
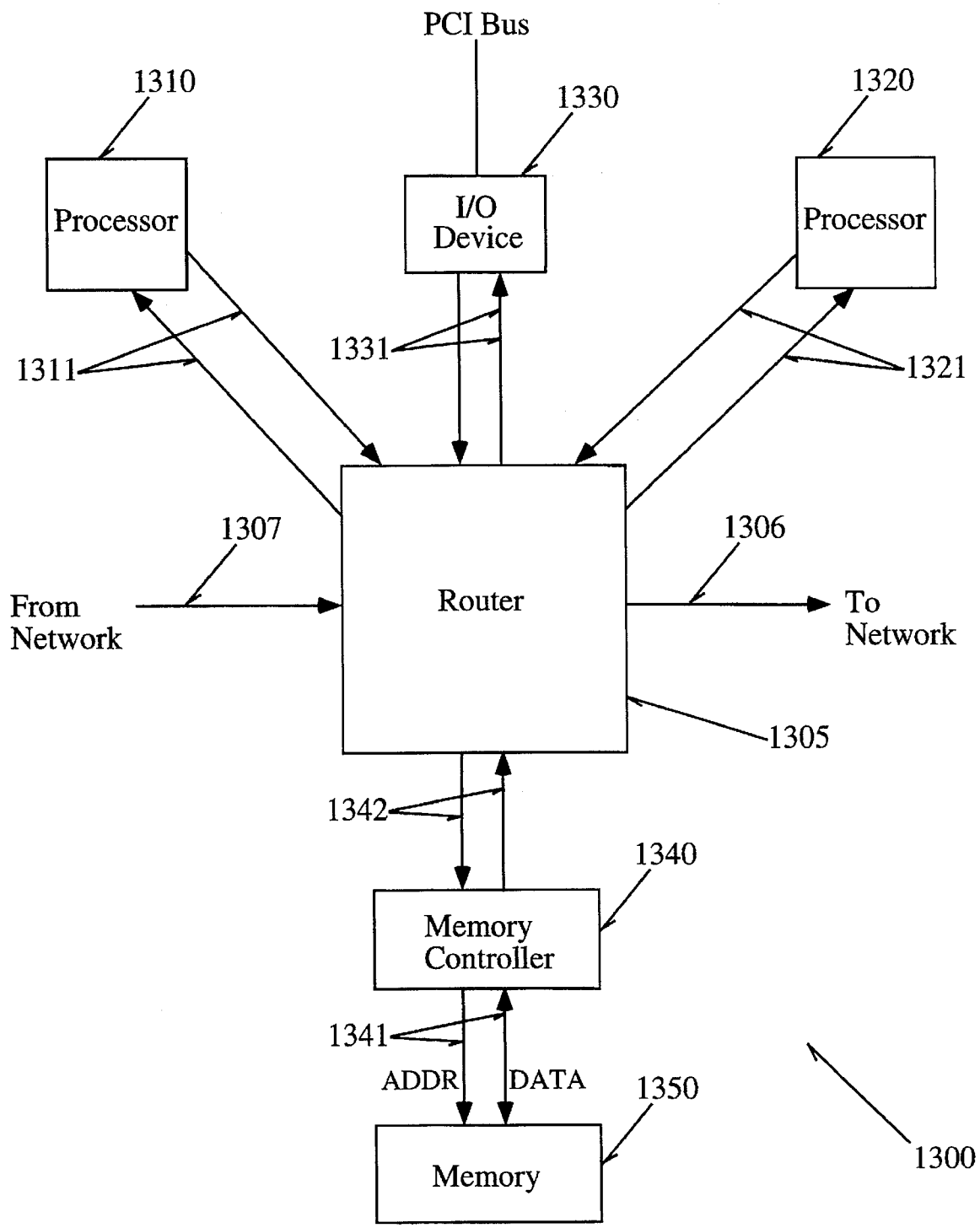
FIG. 13 shows an example topology employing processor (s), input/output (I/O) ports, and an associated memory controller and memory.

A micro-cluster may also include an input/output device 1330. This input/output device 1330 is coupled to a standard peripheral component interface (PCI) type bus. In this instance, the two processors will communicate with the memory controller for accesses to memory. In addition, the processors will be able to communicate with the input/output device via memory-mapped areas as detected by the memory controller and/or router. Such a configuration is illustrated in FIG. 13. In FIG. 13, the micro-cluster 1300 comprises a router 1305 which provides the necessary inter-connections between the various components in the micro-cluster. For example, the router may communicate with the remainder of the network comprising other micro-clusters via uni-directional point-to-point links 1307 and 1306. 1306 will be used for transmitting information to the remainder of the network, and 1307 will be used for receiving information from the network. As will be shown below, such networks of micro-clusters provide a very convenient way to transmit messages, for example, in a uni-directional path throughout the network. In this instance, requests to and from the various micro-clusters in the system may include memory accesses to remote memories connected to other micro-clusters wherein all the memories in the system are treated as a "global" address space accessible to all the micro-clusters. In this instance, the requests are broadcast and transmitted to the appropriate memory controller according to the pre-assigned address space for each micro-cluster and the address information contained in the access request in order to determine whether the access is to its local micro-cluster's area of memory.

The router may be coupled to a pair of uni-directional communication lines 1342 such as point-to-point or other communication lines which receives accesses to the local memory. Then, the memory controller 1340 performs memory access via address and data lines 1341 to or from the memory unit 1350. Typical prior art protocols and interfaces which are not required to be point-to-point (but may be depending on implementation) for accessing the memory device may be used. In addition, accesses to or from processors 1310 or 1320, or input/output device 1330 may be performed via an appropriate communication scheme via the assignment of ports on the router to appropriate devices. This may be done as was discussed previously either via memory-mapping or by message passing by means of a pre-assigned unique identifier for the processors, memory or input/output devices. In implemented embodiments, router 1305 may be implemented using a hardware state machine for examining messages or bits in messages to determine where to route requests. Alternatively, this may be implemented using a dedicated pre-assigned micro-controller and associated local scratch-pad D memory for retaining the assigned address space of the local cluster and/or other clusters in the network.

Each memory controller and each micro-cluster using a topology such as that illustrated in FIG. 13 can enable the memory controller to have copies of tag stores of both processors in the micro-cluster. There is an entry for each cache line on the processors in this duplicate cache tag store. This allows the memory controller to filter the cache consistency information that is received from the memory network or from the local processors. As in a standard prior art cache consistency model, so called "snoop" cycles may be performed in order to ensure the validity of the contents of the cache. Any changes in the state of a cache line will cause invalidations and appropriate snoops will be performed to detect changes to the input stream that would effect the contents of the caches. The consistency of caches between micro-clusters in maintained by broadcasting all read and invalidate requests into the memory network to be routed to all other micro-clusters in the system. If neither processor in the micro-cluster has a copy of the cache line, this information is discarded. Otherwise, cache consistency information is presented to the processors in the same manner as if it were from the other processor within the micro-cluster. Similarly, memory-map accesses to the input/output device 1330 may also be performed.

Figure 14:
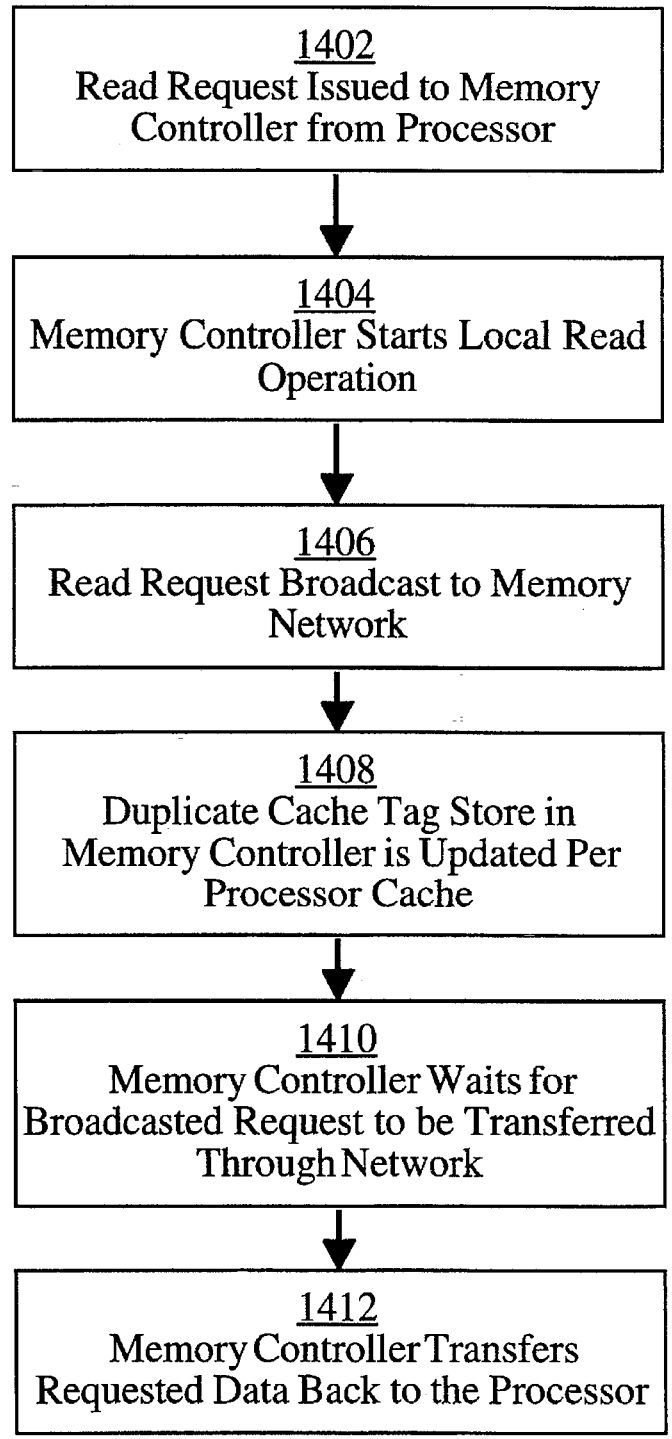
FIG. 14 shows a flowchart of a process for reading a memory location from a local memory.

Details of the accesses to either local memory or remote memory in such a network of micro-clusters will now be discussed. For example, as illustrated in FIG. 14, a read access to local memory may be detected by router 1305 via examination of the address contained in one of the accesses indicated by either of the processors 1310 or 1320. This request is generated at step 1402 as illustrated in FIG. 14. Then, the message or access is passed to the memory controller 1340 which can then start its local read operation after detection that the address is contained within the local memory at step 1404. The read request then is simultaneously broadcast by the router to the memory network at step 1406, for example, in the configuration of FIG. 13 via line 1306. This is to allow all other duplicate cache stores to be updated in the appropriate micro-clusters in the remainder of the network. Then, the duplicate cache store in the memory controller is updated as per the processor cache at step 1408. The memory controller then waits for the broadcasted request to be transferred through the network, that is, awaiting the receipt of the broadcast request back through line 1307 connected to router 1305. Once received, the memory controller can then transfer the data back to the processor at step 1412, thus ensuring that all other micro-clusters in the system have remained consistent with the micro-cluster performing the access. Thus, the read access to local memory is now complete.

As a performance enhancement, one bit of information can be maintained per cache line indicating that the local memory is shared outside of the local cluster. In this way, memory can be given to the processor without waiting for a signal (e.g., a cache lookup) to be received from the remainder of the network.

Figure 15:
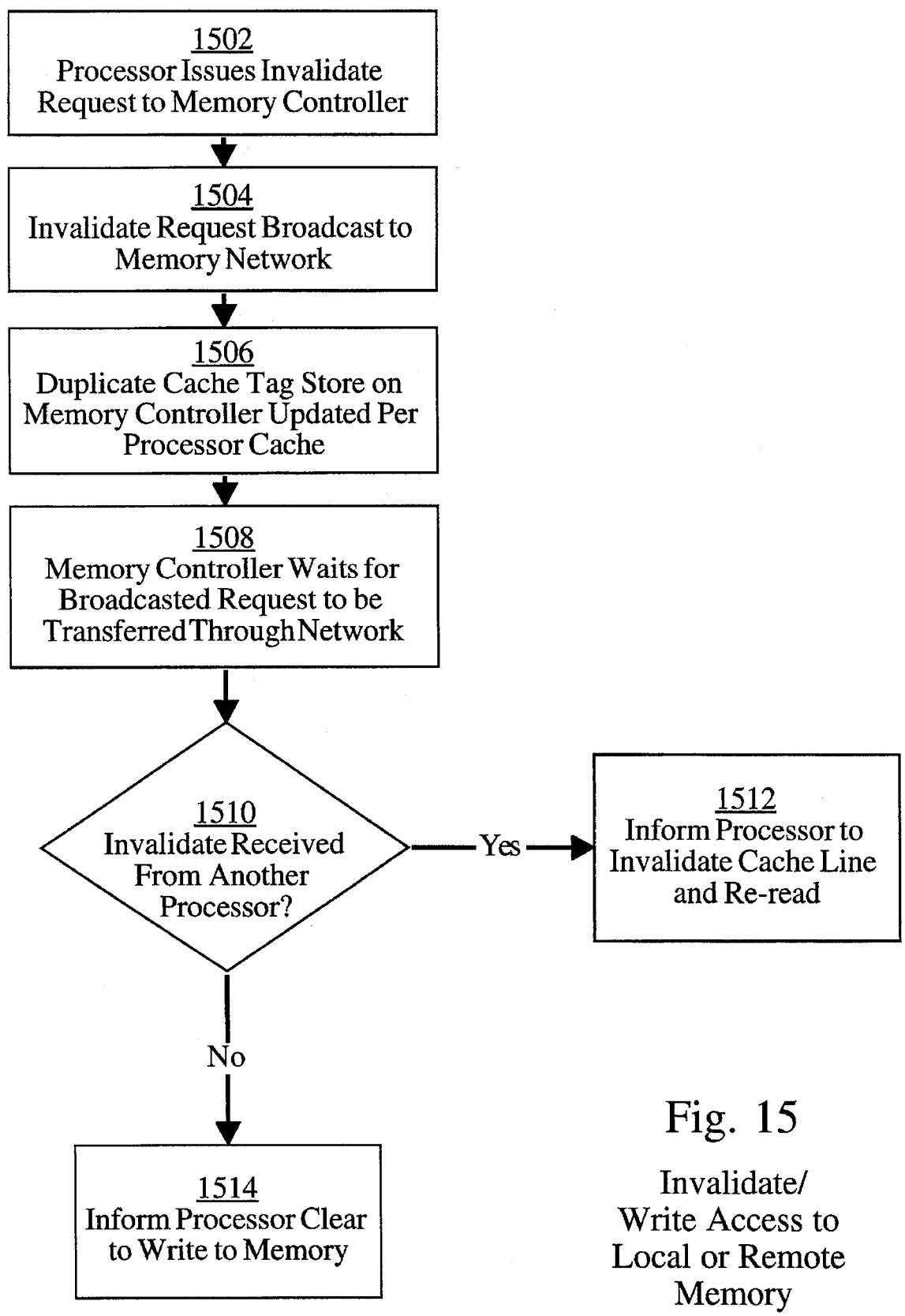
FIG. 15 shows a flowchart of an invalidate/read access to a local or a remote memory.

An invalidate/write access to local or remote memory is similar to the read request, and is illustrated with reference to FIG. 15. In this instance, the processor (either local or remote) issues an invalidate request at step 1502. This invalidate request is then broadcast to the memory network at 1504 by the appropriate router which is directly coupled to the processor. In a uni-directional communication scheme such as 1300 of FIG. 13, it is broadcast in a single direction only. Then, the duplicate cache store on the memory controllers are updated per the processor cache at step 1506. The memory controller broadcasting the request then awaits the broadcast request to be transferred through the network at step 1508, that is, receive the broadcast request from the opposite direction to which it was transmitted (e.g., from line 1307). Then, at step 1510, it is determined whether an invalidate request has been received from another processor in the network, preempting the broadcast request which was sent by the processor. If so, then the processor is alerted to invalidate its cache line and re-read the memory location at step 1512. If not, then the processor may be instructed that it is now clear to write to memory at step 1514, that is, that no other write or invalidate requests have been made to the memory location accessed. Then, the write may be done in a similar manner, transmitting the request from the source micro-cluster and propagating it through the network.

Figure 16:
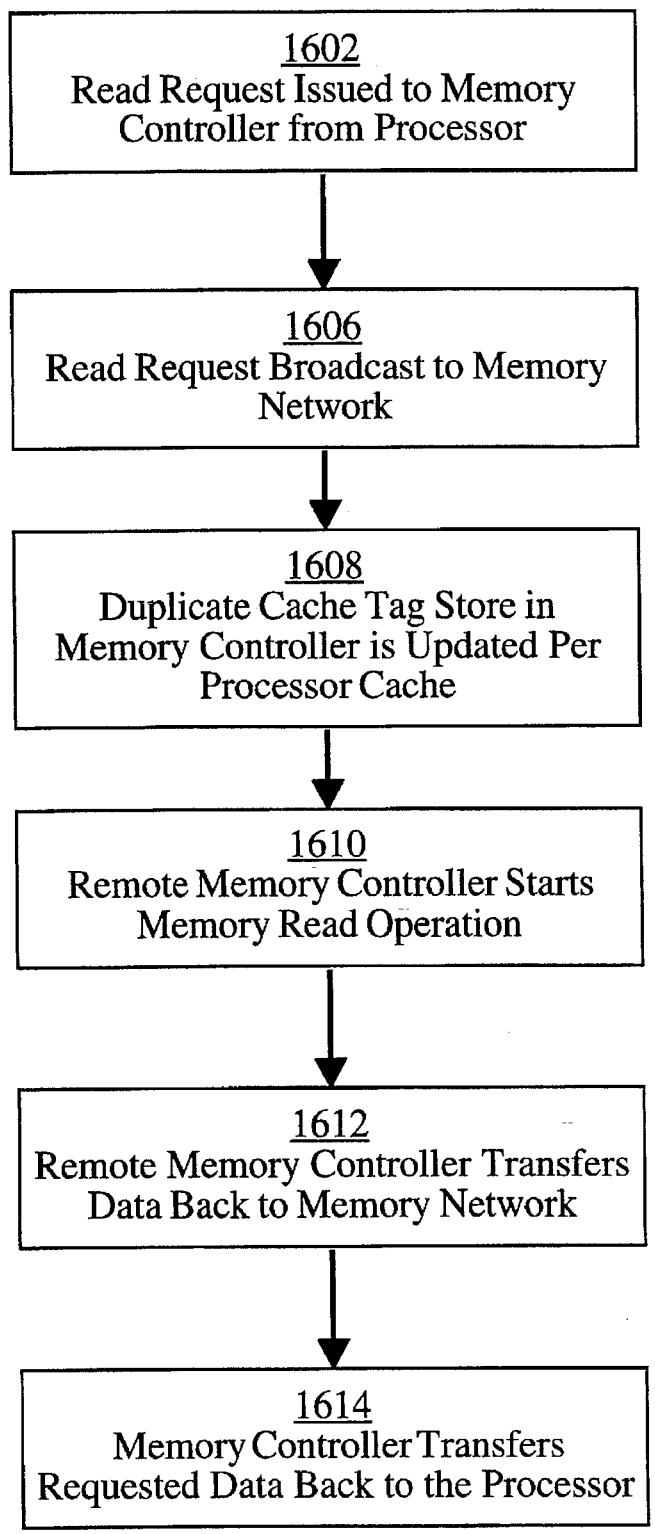
FIG. 16 shows a flowchart of a process for reading a memory location from a remote memory.

A read access to remote memory is slightly different than that for a local memory as shown in FIG. 14. The read access to remote memory is illustrated in FIG. 16. For example, the read request also is detected as being issued from the processor at step 1602 to the memory controller (e.g., 1340). In addition to being transmitted to the local memory controller for updating of the duplicate cache store, the read request is broadcast to the memory network at step 1606 to the information request. The duplicate cache store in the memory controller is updated as per the processor cache at step 1608. This is to maintain the duplicate cache stores in all the memory controllers in the network consistent with one another. Then, the remote memory controller receiving the read request by examination of the appropriate address and its assigned memory space in the local micro-cluster starts the memory read operation at step 1610. Once the data has been accessed, the remote memory controller can then transfer the data back through the memory network at step 1612, for example, by transmitting the requested data on an outgoing line to the network. Once the data is received by the requesting micro-cluster at step 1614, then the requesting processor receives the data.

Figure 17:
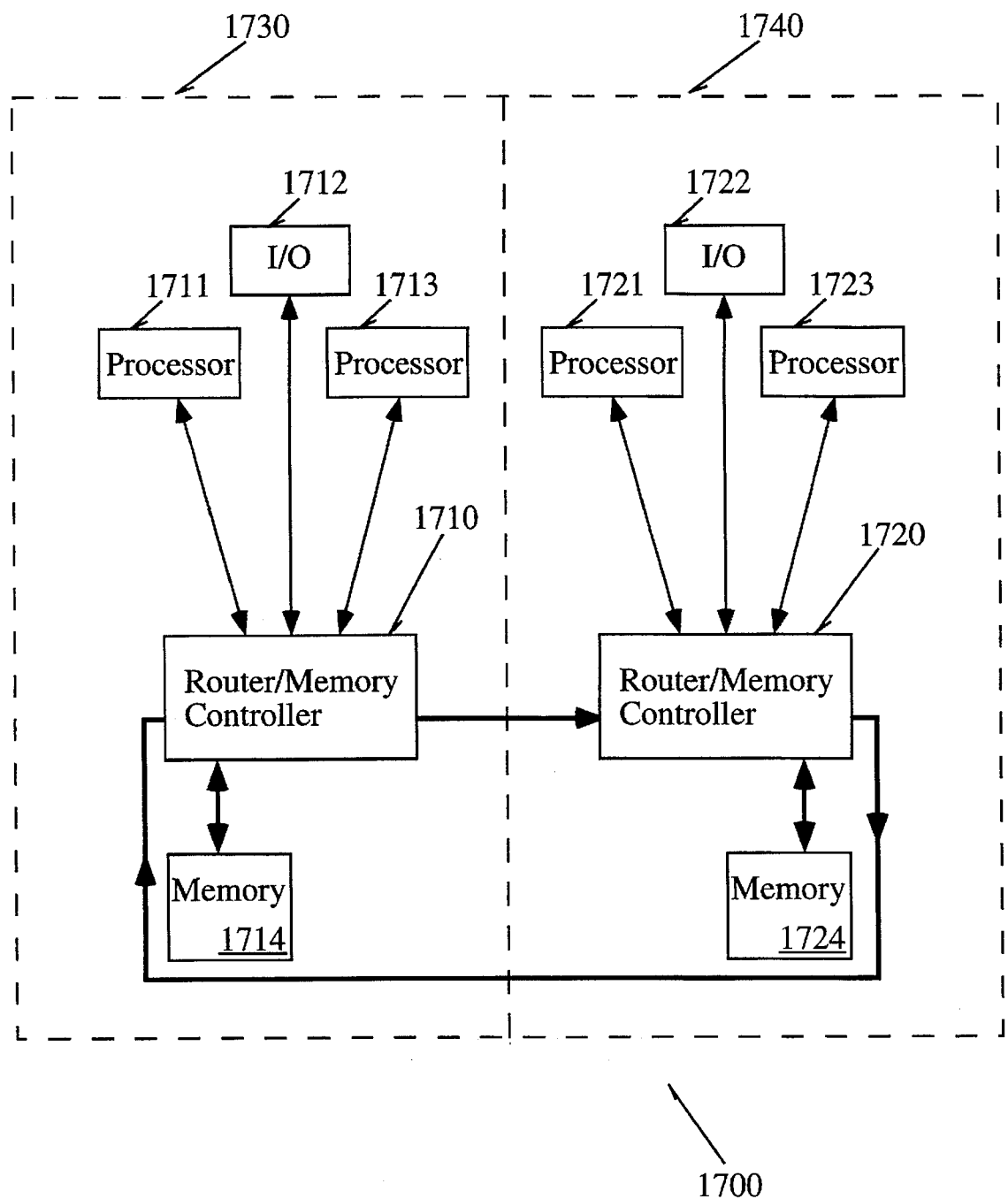
FIG. 17 shows an example topology of a computer system using clusters as described in FIG. 13 above.

An example topology of a network having micro-clusters employing the structure shown in FIG. 13 is illustrated in FIG. 17. For example, network 1700 may comprise two micro-clusters 1730 and 1740 each having a separate memory controller/routing de(rices 17 10 and 1720. Each of the routing devices' microcontroller provide the necessary inter-connection for each of the processors to which it is connected in the local memory device. In this manner, connection may be point-to-point from each of the components and other routers, wherein routing is performed by the local memory controller/routing device such as 1710 or 1720.

Figure 18:
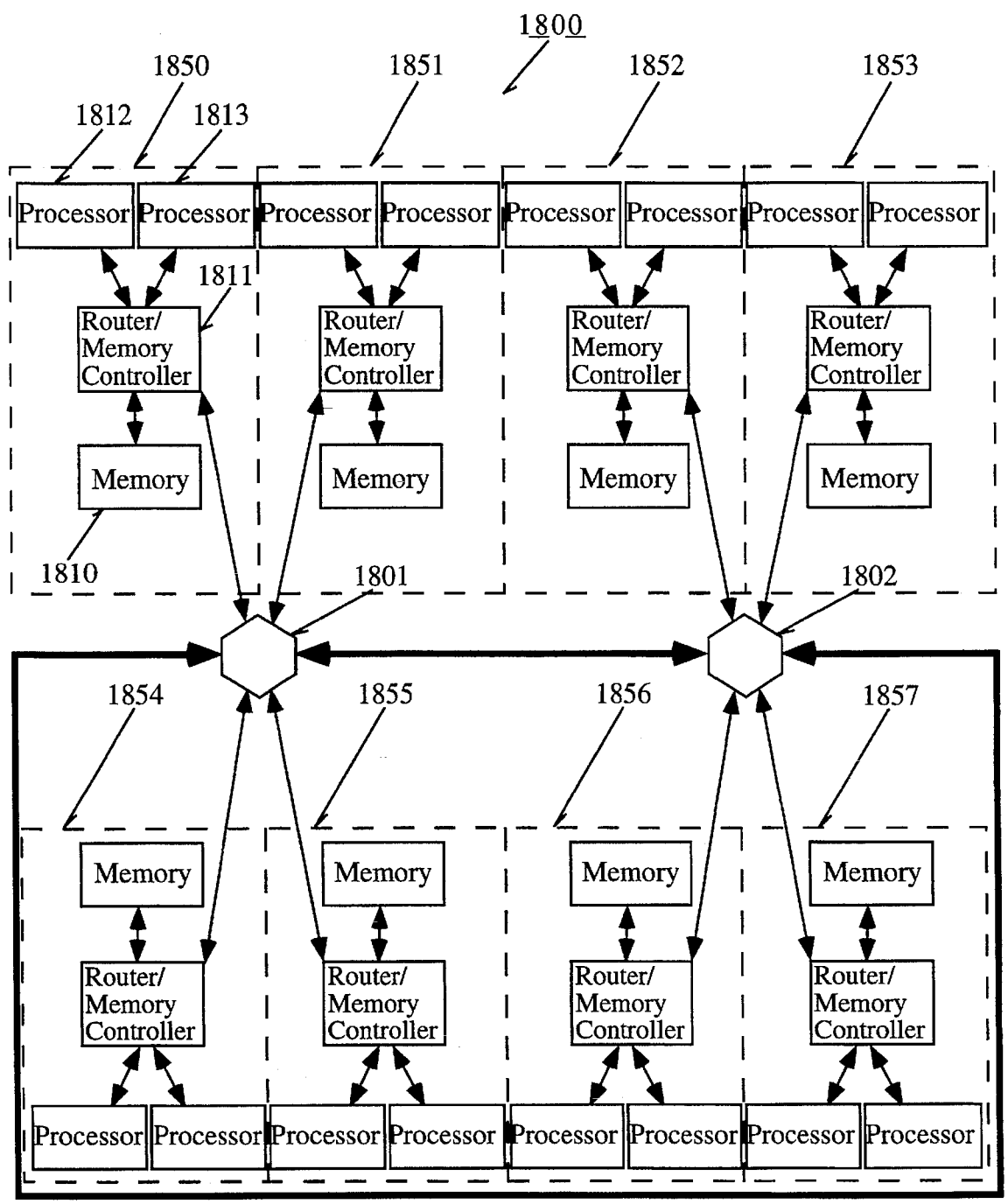
FIG. 18 shows an example of a number of clusters which may be linked to form a computer system.

A more complex network is shown in FIG. 18. 1800 of FIG. 18 comprises essentially two main routers 1801 and 1802 which provide all the necessary point-to-point interconnects for all of the 8 clusters 1850–1857 in the system. Note that each of the micro-clusters 1850–1857 contains its own local memory such as 1810 of cluster 1850 which can communicate via the memory controller/router 1811 with either of the two processors 1812 or 1813, or any of the processors in the remainder of the network. Using a similar scheme, any number of processors may be coupled in any variety of configurations. In this way, each of these local memories may be assigned its own separate memory address space, and processors either remote or local may access that separate memory address space via appropriate routing and determination of whether the access is local or remote, and via broadcast to all other micro-clusters in the network.

Figure 19:
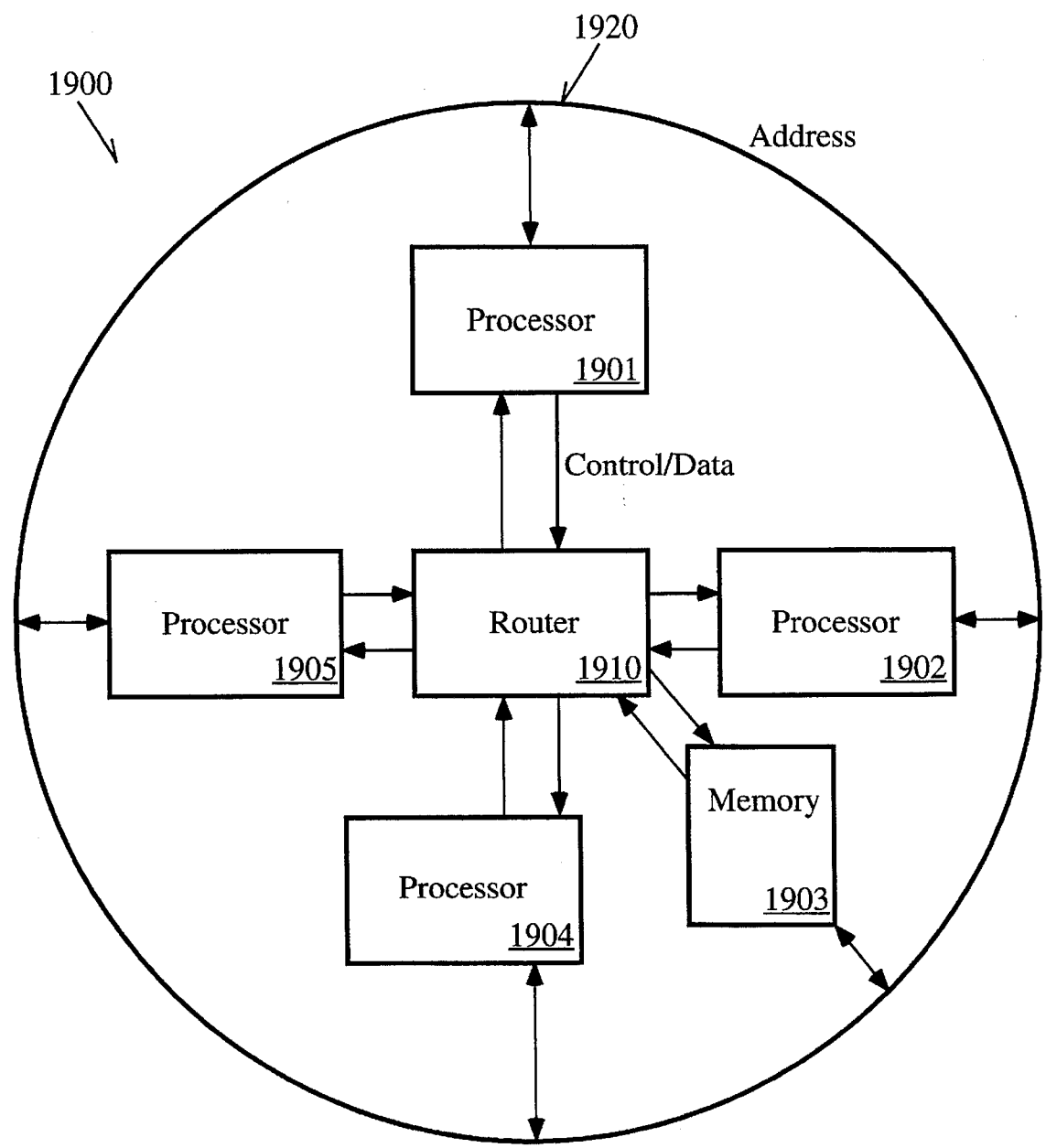
FIG. 19 shows another example of a topology which may be implemented in computer systems using embodiments of the present invention.

Yet another alternative configuration for a multi-processing environment is illustrated in FIG. 19. System 1900 of FIG. 19 includes a plurality of computing resources 1901–1905 which each have requisite circuitry for bi-directional communication via point-to-point communication schemes with router 1910. Included within this topology shown as 1900 is router 1910 which includes at least five communication channels for communicating with each of the processors 1901, 1902, 1904 and 1905, and memory 1903. Each of the computing resources 1901–1905 further includes dual direction communication over a shared bus for communicating address information with all other computing resources in the toruss. In this manner, using a message passing scheme as discussed above, however, adapted for the particular topology that communication among the computing resources may be performed. In this manner, a multi-processing environment may be provided including among the shared memory resource 1903 shown in FIG. 19. Using either a plurality of control words preceding the message, or, control information sent on control lines using the uni-directional interface, appropriate message passing among computing resources may be performed within system 1900. Note that any of computing resources 1901–1905 may be processors, co-processors, memory devices and associated control circuitry, input/output devices, or other computing resources. Note that a detailed description of the internal structure of the computing resource may be similar to those described above. This allows high performance processing, and alleviates the disadvantages of prior art shared bus technology which presents an upper limit on the performance of the bus.

Thus, computer systems and communication schemes for communicating between computing resources using point-to-point phase-tolerant communication has been described. Although the present invention has been described with reference to very specific detailed implementations, in FIGS. 1–19, these are to be viewed in an illustrative manner only, and are not intended to limit the present invention. Various modifications and departures from the specific techniques described her may be made, by one skilled in the art, without departing from the overall spirit and scope of the present invention. Thus, the above example are to be viewed in an illustrative manner only, and the present invention is limited only by the appended claims which follow.

What is claimed is:

1. A phase-tolerant communication scheme, comprising:
   a first computing resource generating a first clock signal;
   a first clock line coupled to the first computing resource for communicating the first clock signal from the first computing resource;
   a first plurality of data lines coupled to the first computing resource for communicating data from the first computing resource; and
   a second computing resource coupled to the first plurality of data lines and to the first clock line, the second computing resource generating a second clock signal with an unknown phase relationship to the first clock signal, the second computing resource comprising:
   a first buffer coupled to the first plurality of data lines,
   a first control circuit coupled to the first clock line that generates a first delayed clock signal in response to the first clock signal,
   a first write pointer circuit coupled to the first clock line that generates a first write pointer in response to the first clock signal, and
   a first read pointer circuit coupled to the first control circuit that generates a first read pointer in response to the first delayed clock signal;
   wherein data from the first computing resource is stored in the first buffer according to the first write pointer and data is read from the first buffer according to the first read pointer.

2. The phase-tolerant scheme of claim 1, wherein the first clock signal is in phase with the data communicated by the first plurality of data lines.

3. The phase-tolerant scheme of claim 1, wherein the first computing resource continually sends data over the first plurality of data lines.

4. The phase-tolerant communication scheme of claim 1, further comprising:
   a second plurality of data lines coupled between the first computing resource and the second computing resource for communicating data from the second computing resource to the first computing resource;
   a second clock line coupled between the first computing resource and the second computing resource for communicating the second clock signal to the first computing resource
   wherein the first computing resource further comprises:
   a second buffer coupled to the second plurality of data lines,
   a second control circuit coupled to the second clock line that generates a second delayed clock signal in response to the second clock signal,
   a second write pointer circuit coupled to the second clock line that generates a second write pointer in response to the second clock signal, and
   a second read pointer circuit coupled to the second control circuit that generates a second read pointer in response to the second delayed clock signal;
   wherein data from the second computing resource is stored in second buffer according to the second write pointer and data is read from the second buffer according to the second read buffer.

5. The phase-tolerant scheme of claim 4, wherein the second clock signal is in phase with the data communicated by the second plurality of data lines.

6. The phase-tolerant scheme of claim 4, wherein the second computing resource continuously sends data over the second plurality of data lines.

7. The phase tolerant communication scheme of claim 4, wherein the second buffer comprises a first-in/first-out (FIFO) buffer.

8. The phase-tolerant communication scheme of claim 4, wherein the second computing resource further comprises a second reset synchronizer coupled to the second write pointer circuit, the second read pointer circuit, the second clock line and to the second control circuit, the second reset synchronizer generating a second write reset signal and a second read reset signal.

9. The phase-tolerant communication scheme of claim 4, wherein the first computing resource comprises a processor and the second computing resource comprises memory circuitry.

10. The phase-tolerant communication scheme of claim 4, wherein the first computing resource comprises a first processor and the second computing resource comprises a second processor.

11. The phase-tolerant communication scheme of claim 1, wherein the first buffer comprises a first-in/first-out (FIFO) buffer.

12. The phase-tolerant communication scheme of claim 1, wherein the first computing resource further comprises a first reset synchronizer coupled to the first write pointer circuit, the first read pointer circuit, the first clock line and to the first control circuit, the first reset synchronizer generating a first write reset signal and a first read reset signal.

13. A computer system, comprising:
   a processor generating a first clock signal;
   a first clock line coupled to the processor for communicating the first clock signal;
   a first plurality of data lines coupled to the processor for communicating data from the processor; and
   a memory coupled to the first plurality of data lines and to the first clock line, the memory generating a second clock signal with an unknown phase relationship to the first clock signal, the memory comprising:
   a first buffer coupled to the first plurality of data lines,
   a first control circuit coupled to the first clock line that generates a first delayed clock signal in response to the first clock signal,
   a first write pointer circuit coupled to the first clock line that generates a first write pointer in response to the first clock signal, and
   a first read pointer circuit coupled to the first control circuit that generates a first read pointer in response to the first delayed clock signal;
   wherein data from the processor is stored in the first buffer according to the first write pointer and data is read from the first buffer according to the first read pointer.

14. The computer system of claim 13, wherein the first clock signal is in phase with the data communicated by the first plurality of data lines.

15. The computer system of claim 13, wherein the processor continually sends data over the first plurality of data lines.

16. The computer system of claim 13, wherein the first buffer is a first-in/first-out (FIFO) buffer.

17. The computer system of claim 13, wherein the processor further comprises a first reset synchronizer coupled to the first write pointer circuit, the first read pointer circuit, the first clock line and to the first control circuit, the first reset synchronizer generating a first write reset signal and a first read reset signal.

18. The computer system of claim 13, further comprising:
a second plurality of data lines coupled between the processor and the memory for communicating data from the memory to the processor;
a second clock line coupled between the processor and the memory for communicating the second clock signal to the processor
wherein the processor further comprises:
a second buffer coupled to the second plurality of data lines,
a second control circuit coupled to the second clock line that generates a second delayed clock signal in response to the second clock signal,
a second write pointer circuit coupled to the second clock line that generates a second write pointer in response to the second clock signal, and
a second read pointer circuit coupled to the second control circuit that generates a second read pointer in response to the second delayed clock signal;
wherein data from the memory is stored in the second buffer according to the second write pointer and data is read from the second buffer according to the second read pointer.

19. The computer system of claim 18, wherein the second clock signal is in phase with the data communicated over the second plurality of data lines.

20. The computer system of claim 18, wherein the memory continually sends data over the second plurality of data lines.

21. The computer system of claim 18, wherein the second buffer comprises a first-in/first-out (FIFO) buffer.

22. The computer system of claim 18, wherein the memory further comprises a second reset synchronizer coupled to the second write pointer circuit, the second read pointer circuit, the second clock line and to the second control circuit, the second reset synchronizer generating a second write reset signal and a second read reset signal.

23. A multi-processor system, comprising:
a first processor generating a first clock signal;
a first clock line coupled to the first processor for communicating the first clock signal;
a first plurality of data lines coupled to the first processor for communicating data from the first processor; and
a second processor coupled to the first plurality of data lines and to the first clock line, the second processor generating a second clock signal with an unknown phase relationship to the first clock signal, the second processor comprising:
a first buffer coupled to the first plurality of data lines,
a first control circuit coupled to the first clock line that generates a first delayed clock signal in response to the first clock signal,
a first write pointer circuit coupled to the first clock line that generates a first write pointer in response to the first clock signal, and
a first read pointer circuit coupled to the first control circuit that generates a first read pointer in response to the first delayed clock signal;
wherein data from the first processor is stored in the first buffer according to the first write pointer and data is read from the first buffer according to the first read pointer.

24. The multi-processor system of claim 23, wherein the first clock signal is in phase with the data communicated over the first plurality of data lines.

25. The multi-processor system of claim 23, wherein the first processor continually sends data over the first plurality of data lines.

26. The multi-processor system of claim 23, wherein the first buffer is a first-in/first-out (FIFO) buffer.

27. The multi-processor system of claim 23, wherein the first processor further comprises a first reset synchronizer coupled to the first write pointer circuit, the first read pointer circuit, the first clock line and to the first control circuit, the first reset synchronizer generating a first write reset signal and a first read reset signal.

28. The multi-processor system of claim 23, further comprising:
a second plurality of data lines coupled between the first processor and the second processor for communicating data from the second processor to the first processor;
a second clock line coupled between the first processor and the second processor for communicating the second clock signal to the first processor
wherein the first processor further comprises:
a second buffer coupled to the second plurality of data lines,
a second control circuit coupled to the second clock line that generates a second delayed clock signal in response to the second clock signal,
a second write pointer circuit coupled to the second clock line that generates a second write pointer in response to the second clock signal, and
a second read pointer circuit coupled to the second control circuit that generates a second read pointer in response to the second delayed clock signal;
wherein data from the second processor is stored in the second buffer according to the second write pointer and data is read from the second buffer according to the second read pointer.

29. The multi-processor system of claim 28, wherein the second clock signal is in phase with the data communicated over the second plurality of data lines.

30. The multi-processor system of claim 28, wherein the second processor continually sends data over the second plurality of data lines.

31. The multi-processor system of claim 28, wherein the second buffer comprises a first-in/first-out (FIFO) buffer.

32. The multi-processor system of claim 28, wherein the second processor further comprises a second reset synchronizer coupled to the second write pointer circuit, the second read pointer circuit, the second clock line and to the second control circuit, the second reset synchronizer generating a second write reset signal and a second read reset signal.

* * * * *